United States Patent
Haulsee

(10) Patent No.: US 10,801,591 B2
(45) Date of Patent: Oct. 13, 2020

(54) SYSTEM AND METHOD FOR CONVERTING ROTATING MOTION INTO LINEAR MOTION

(71) Applicant: CROWN PACKAGING TECHNOLOGY, INC., Alsip, IL (US)

(72) Inventor: Donald Haulsee, Claremont, VA (US)

(73) Assignee: Crown Packaging Technology, Inc., Alsip, IL (US)

( * ) Notice: Subject to any disclaimer, the term of this patent is extended or adjusted under 35 U.S.C. 154(b) by 139 days.

(21) Appl. No.: 16/016,214

(22) Filed: Jun. 22, 2018

(65) Prior Publication Data

US 2018/0372193 A1    Dec. 27, 2018

Related U.S. Application Data

(60) Provisional application No. 62/524,409, filed on Jun. 23, 2017.

(51) Int. Cl.
| | |
|---|---|
| *F16H 19/06* | (2006.01) |
| *F16H 21/18* | (2006.01) |
| *F16H 35/02* | (2006.01) |
| *F16H 25/12* | (2006.01) |
| *F16H 37/12* | (2006.01) |
| *F16H 21/36* | (2006.01) |

(52) U.S. Cl.
CPC ......... *F16H 19/0622* (2013.01); *F16H 21/18* (2013.01); *F16H 21/365* (2013.01); *F16H 25/122* (2013.01); *F16H 35/02* (2013.01); *F16H 37/126* (2013.01)

(58) Field of Classification Search
CPC .. F16H 19/0622; F16H 21/365; F16H 37/126; F16H 25/122; F16H 35/02; F16H 21/18; F16H 37/122; F16H 37/124; F16H 37/128
See application file for complete search history.

(56) References Cited

U.S. PATENT DOCUMENTS

| | | | | |
|---|---|---|---|---|
| 1,897,140 | A | * 2/1933 | Perez | ........................ F16H 21/36 74/52 |
| 4,089,228 | A | 5/1978 | Obra | |
| 4,715,240 | A | * 12/1987 | Erich | .................... F04B 47/022 74/41 |

(Continued)

FOREIGN PATENT DOCUMENTS

| | | |
|---|---|---|
| DE | 2626239 A1 | 12/1976 |
| WO | WO 2008/061948 A1 | 5/2008 |

*Primary Examiner* — Victor L MacArthur
(74) *Attorney, Agent, or Firm* — BakerHostetler

(57) ABSTRACT

A system includes a rotating drive and a linear drive. An input driven gear may be coupled to the rotating drive while a sun gear is coupled to the shaft of the input driven gear. A first counterweight may support an idler gear and an output gear. The first counterweight is coupled to the driven gear and which rotates with the driven gear. The idler gear is coupled to the sun gear and an output gear. The idler gear may rotate the output gear when the idler gear is translated around the sun gear. A second counterweight is coupled to the output gear and which rotates with the output gear when the output gear is rotated by the idler gear. An end portion of the second counterweight coupled to the linear drive moves in substantially straight line as the second counterweight rotates while also being translated around the sun gear.

20 Claims, 16 Drawing Sheets

(56) References Cited

U.S. PATENT DOCUMENTS

| | | | | |
|---|---|---|---|---|
| 9,279,363 | B2* | 3/2016 | De Gooijer | F02B 67/04 |
| 10,145,299 | B2* | 12/2018 | De Gooijer | F02B 75/048 |
| 10,234,006 | B2* | 3/2019 | De Gooijer | F16H 37/124 |
| 10,557,409 | B2* | 2/2020 | Pogam | F02B 75/048 |
| 2001/0029922 | A1* | 10/2001 | Dow | F02B 75/002 |
| | | | | 123/197.1 |
| 2003/0183026 | A1* | 10/2003 | Korniyenko | F01B 9/026 |
| | | | | 74/49 |
| 2018/0372193 | A1* | 12/2018 | Haulsee | F16H 25/122 |

* cited by examiner

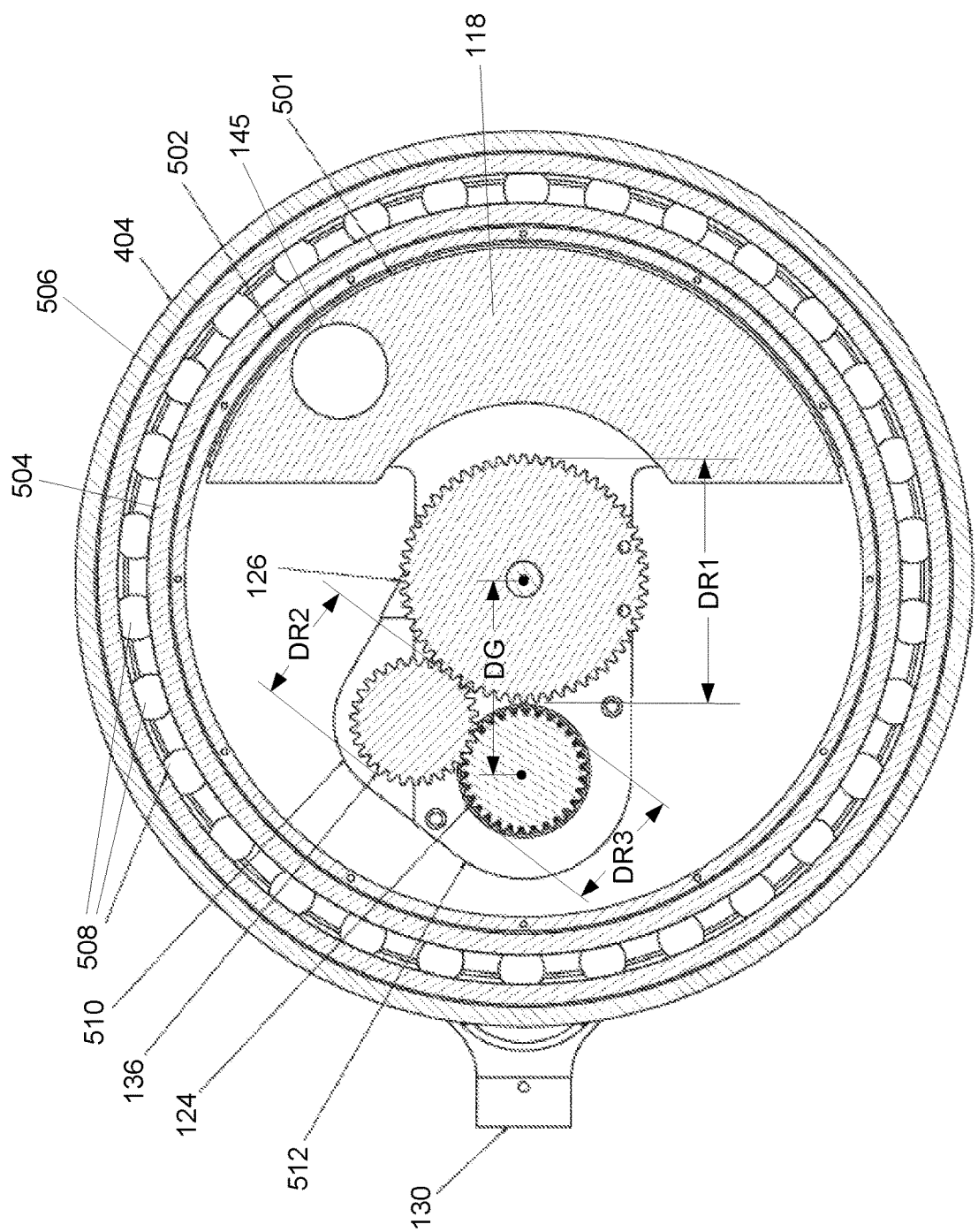
FIG. 5A  SECTION C-C

SECTION A-A

SECTION B-B

SYSTEM AND METHOD FOR CONVERTING ROTATING MOTION INTO LINEAR MOTION

DESCRIPTION OF THE RELATED ART

High speed manufacturing techniques often need machines which can translate one form of motion to another. For example, high speed manufacturing techniques often need to transfer/translate/transform rotating motion into linear motion and visa-versa.

In the past, such a transformation of rotating motion into linear motion was possible with a cardan-gear. The cardan-gear was invented by Girolamo Cardano in the 16th century. It is used to convert rotation motion to reciprocating linear motion without using linkages or slideways.

While the cardan-gear did provide some advantages in its day, its gear system is not well suited for high-speed, high-volume manufacturing environments. Its gear system is not well suited for high-speed manufacturing environments because its two rotating gears are often not stable at high revolutions per minute (RPMs), such as on the order of 500 RPMs and up. The two rotating gears often wear down quickly when the gears are being used 24 hours per day/7 days a week in high-volume manufacturing environments.

Exemplary manufacturing environments where making a product requires precise dimensioning/sizing for materials and that usually requires 24 hour per day production includes aluminum can manufacturing. Aluminum cans usually must be produced with very little variations in their wall thickness.

Typically an aluminum can must have less than 0.0002" wall variation in the lower two-thirds of the can to provide its column strength. Wall variation in the upper one-third of a can usually must be less than 0.0004" to ensure that the necking operation (reduce open diameter size for metal savings) does not fail or produce visual defects. Therefore, the forming punch to produce a can must be driven very accurately through the forming dies—i.e. in a straight line or horizontal.

After an aluminum can is formed and removed from a punch, the punch and ram must retract accurately through the forming dies. If the punch contacts the dies during the retract stroke then damage to the dies and punch may occur. This tooling damage will cause either wall variation, wall surface finish disruptions, or disrupt container strength during forming so that the forming operation fails and the metal of the can rips.

This failure in can production is typically called a "tear off." A tear off rate of 1 tear per 10,000 is considered so severe as it will usually require a can manufacturer to shut a production line down. One goal for a can manufacturer is typically 1 tear off per 100,000 cans. Exact/precise straight line motion is a key to minimizing tooling damage and thus sustaining an acceptable tear off rate for can production.

The can manufacturing market in the United States is approximately 90 billion cans per year as of this writing. High machine speeds are thus required to fulfill market demands. A can bodymaker typically runs from 300 to 400 strokes per minute depending on can size. Those speeds require robust, lightweight drive systems. High reciprocating mass reduces machine speed and also reduces reliability.

What is needed in the art is a method and system for aluminum can production that has less mass than conventional machines. What is further needed in the art is a method and system for producing linear motion from reciprocating motion that uses less, such as on the order of one-half of, the links and bearings used in conventional systems. Thus, a method and system are needed that provide the technological base to increase can making speeds into the 400 to 500 stroke per minute range while maintaining or even increasing reliability.

And stated more broadly, what is needed in the art is a method and/or system for converting rotating motion into linear motion (and/or vice-versa) that is stable at high RPMs and is less prone to mechanical wear relative to the conventional cardan-gear.

SUMMARY OF THE DISCLOSURE

A method and system for transforming rotating motion into linear motion may include means for producing rotating motion and means for receiving linear motion. A first gear may be coupled to the means for producing rotating motion while a second gear is coupled to the first gear and which remains stationary while the first gear is rotated by the means for producing rotating motion.

The method and system may further include a first holding device that supports an idler gear and an output gear. The holding device may be coupled to the first gear and which rotates with the first gear. The idler gear may be coupled to the second gear and the output gear. The holding device may translate the idler gear around the second gear when the first gear is rotated. The idler gear may rotate the output gear when the idler gear is translated around the second gear.

The system may also include a second holding device coupled to the output gear which rotates with the output gear when the output gear is rotated. The second holding device may have an end portion coupled to a link. An arm may be coupled to the means for receiving linear motion and to the link. The end portion of the second holding device may move in a substantially linear direction when the second holding device is rotated by the output gear and translates around the second gear. The end portion may move the link in the substantially linear direction.

According to one exemplary embodiment, the first holding device and second holding device may comprise counterweights. The end portion of the second holding device may also comprise a pin where the pin is coupled to the link.

The first gear and second gear may be coupled to a shaft. The first gear and second gear may also share a same geometrical center about which the first gear rotates while the second gear remains stationary The arm may comprise a shaft and the arm may be coupled to a bearing. The link may also comprise a pin that is coupled to the arm.

According to another exemplary embodiment, a system and method for transforming rotating motion into linear motion may include a first gear coupled to a rotating drive. A second gear may be coupled to the first gear [and which remains stationary while the first gear is rotated by the rotating drive.

A first holding device may support an idler gear and an output gear. The holding device may be coupled to the first gear and which rotates with the first gear. The idler gear may be coupled to the second gear and the output gear. The holding device may translate the idler gear around the second gear when the first gear is rotated. The idler gear may rotate the output gear when the idler gear is translated around the second gear.

A second holding device may be coupled to the output gear which rotates with the output gear when the output gear is rotated. The second holding device may have an end portion coupled to a link and an arm.

The end portion of the second holding device may move in a substantially linear direction when the second holding device is rotated by the output gear and translates around the second gear. The end portion may move the link and arm in the substantially linear direction.

According one exemplary embodiment, the arm is part of a linear drive. Further, the first holding device and second holding devices may comprise a counterweight.

According to another exemplary embodiment, a system and method for converting rotating motion to linear motion may comprise forming two holding systems: one for a linear drive and one for a rotating drive. For the first holding system that may be coupled to the rotating drive, a sun gear may be coupled to the same shaft as an input driven gear. The input driven gear may be rotated by the rotating drive while the sun gear remains stationary.

An idler gear and an output gear may be coupled to a first counterweight. The first counterweight may be coupled to the input driven gear.

Next, for the second holding system for the linear drive, a secondary counterweight may be sized/dimensioned such that one end portion moves in a straight line as the secondary counterweight is rotated and translated around the sun gear.

The secondary counterweight may be coupled to the output gear. A pin may be coupled to an end portion of the secondary counterweight and to a link.

The link may be coupled to an arm while the arm is coupled to the linear drive. The rotating drive may be coupled to the input driven gear of the first holding system. The rotating drive may be initialized (i.e. provided with power). The pin and link coupled to the end portion of the secondary counterweight are moved in a substantially linear direction.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 5A is a cross-sectional view of the exemplary embodiment of the system illustrated in FIG. 4 taken along the cut-line C-C of FIG. 4;

DETAILED DESCRIPTION

The word "exemplary" is used herein to mean "serving as an example, instance, or illustration." Any aspect described herein as "exemplary" is not necessarily to be construed as exclusive, preferred or advantageous over other aspects.

Figure 1:
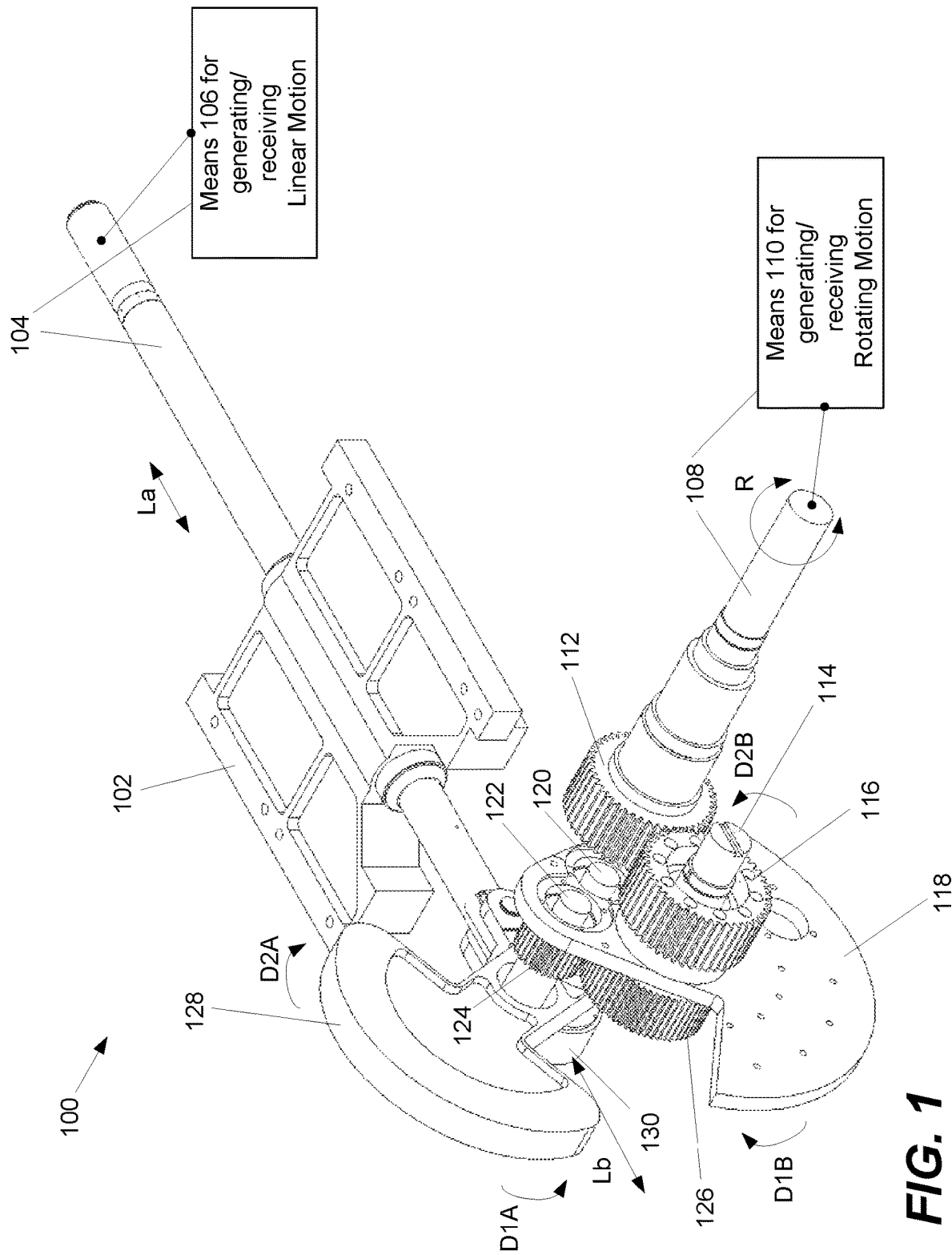
FIG. 1 is a side perspective view of one exemplary embodiment of a system for converting rotating motion into linear motion.

Referring now to FIG. 1, this figure is a side perspective view of one exemplary embodiment of a system 100 for converting rotating motion into linear motion. The system 100 may comprise an input drive gear 112; an input driven gear 116; a primary counterweight 118 which holds an idler gear 136 [not visible in FIG. 1, but see FIG. 3] and an output gear 124. The primary counterweight 118 and input gear 116 are rotatably coupled to a stationary/fixed shaft 114. The stationary/fixed shaft 114 also supports a stationary/fixed sun gear 126. The sun gear 126 meshes with the idler gear 136 [not shown in FIG. 1 but see FIG. 3].

The output gear 124 is coupled to an output link/secondary counterweight 128 such that the secondary counterweight 128 rotates when the output gear 124 rotates. The secondary counterweight 128 is also coupled to a ram connecting link 130.

The ram connecting link 130 is coupled to a ram 104 that may comprise a longitudinal shaft. The ram 104 may be part of or it may be coupled to a means/system 106 for generating/receiving linear motion. The means/system 106 for generating/receiving linear motion may comprise additional rods, shafts, linkages etc. The ram 104 may be held in place by a bearing 102.

According to one exemplary embodiment, the bearing 102 may comprise a fluid type bearing but other types of bearings are possible. Other bearings may include, but are not limited to, plain bearings (that include bushings, journal bearings, sleeve bearings, rifle bearings, and composite bearings); jewel bearings; fluid bearings; magnetic bearings; and flexure bearings, and the like.

The ram 104 may move back and forth in a linear direction as shown by directional arrow La. As will become more apparent from the remaining figures and the corresponding detailed description provided below, one important aspect of the inventive system 100 is that ram connecting link 130 and its pin 134 [see FIG. 2] that couples the link 130 to the secondary counterweight 128 is also moved in a linear direction as shown by directional arrow Lb.

The secondary counterweight 128 is sized appropriately that despite its rotation with output gear 124 and its translation around the sun gear 126, the pin 134 is translated only in a linear direction as indicated by directional arrow Lb. Meanwhile, input gear 112 which is coupled to a shaft 108 may rotate clockwise or counter-clockwise as shown by directional arrow R.

The shaft 108 and/or input gear 112 may be coupled to a means 110 for generating/receiving rotating motion. The means 110 for generating/receiving rotating motion may comprise a circular gear or shaft that is coupled to a motor or any other type of device which may create rotational movement. The means 110 for generating/receiving rotating motion may include the rotatable shaft 108 and input drive gear 112.

When the shaft 108 and input drive gear 112 are rotated in a clockwise direction [when viewing input drive gear 112 of FIG. 1 such that ram 104 is on the right side of the input drive gear 112 and such that the driven gear 116 is on the left side of the input drive gear 112], this causes the input driven gear 116 to rotate in a counter-clockwise direction as shown by directional arrow D2B. The primary counterweight 118 also rotates in the same direction [here, counter-clockwise in this example] as the input driven gear 116 since they are both coupled to the same shaft 114.

However, while the sun gear 126 is also coupled to stationary/fixed shaft 114, the sun gear 126 does not rotate in any direction—it remains fixed as apparent to one of ordinary skill in the art given its "sun gear" designation. The counter-clockwise rotation D2B of the primary counterweight 118 causes the idler gear 136 [not visible in FIG. 1, but see FIG. 3] supported by a shaft 120 and the output gear 124 supported by a shaft 122 to physically translate/move around the sun gear 126, like two "planets" relative to the sun gear 126.

The idler gear 136 and output gear 124 translate around the sun gear 126 along with the primary counterweight 118. The idler gear 136 meshes with the output gear 124 and the sun gear 126. Since the idler gear 136 is the only gear which engages/meshes with the sun gear 126 during its translation around the sun gear 112, the idler gear's 136 counter-clockwise movement/translation also designated by directional arrow D2B around the sun gear 126 causes it to rotate the output gear 124 in a clockwise direction [again, when viewing the page of FIG. 1 where the ram 104 is on the right hand side of the input drive gear 112 and the input driven gear 116 is on the left hand side of the input drive gear 112].

Since the output gear 124 is coupled to the secondary counterweight 128, the clockwise rotation of the output gear 124 [by the idler gear 136] causes the secondary counterweight 128 to rotate in a clockwise direction as shown by directional arrow D2A. Therefore, as the primary counterweight 118 rotates in a counter-clockwise direction as shown by directional arrow D2B, the secondary counterweight 128 rotates in a clockwise direction as shown by directional arrow D2A.

Thus, if input drive gear 112 is rotated in counter-clockwise direction [when viewing the page of FIG. 1 where the ram 104 is on the right-hand side relative to the input drive gear 112], then the input driven gear 116 is driven to rotate in a clockwise direction as shown by directional arrow D1B. This movement of the input driven gear in the clockwise direction causes the primary counterweight 118 to also rotate in the clockwise direction as shown by directional arrow D1B.

And when the counterweight 118 [along with the idler gear 136 and output gear 124] are translated/moved in the clockwise direction around the sun gear 126 as shown by directional arrow D1B, then this causes the idler gear 136 to rotate the output gear 124 in a counter-clockwise direction which also causes the secondary counterweight 128 to rotate in a counter-clockwise direction as shown by directional arrow D1A. Thus, as the primary counterweight 118 rotates in a clockwise direction as shown by directional arrow D1B, the secondary counterweight 128 rotates in a counter-clockwise direction as shown by directional arrow D1A because the output gear 124 is also rotating in the counter-clockwise direction as shown by directional arrow D1A.

Figure 2:
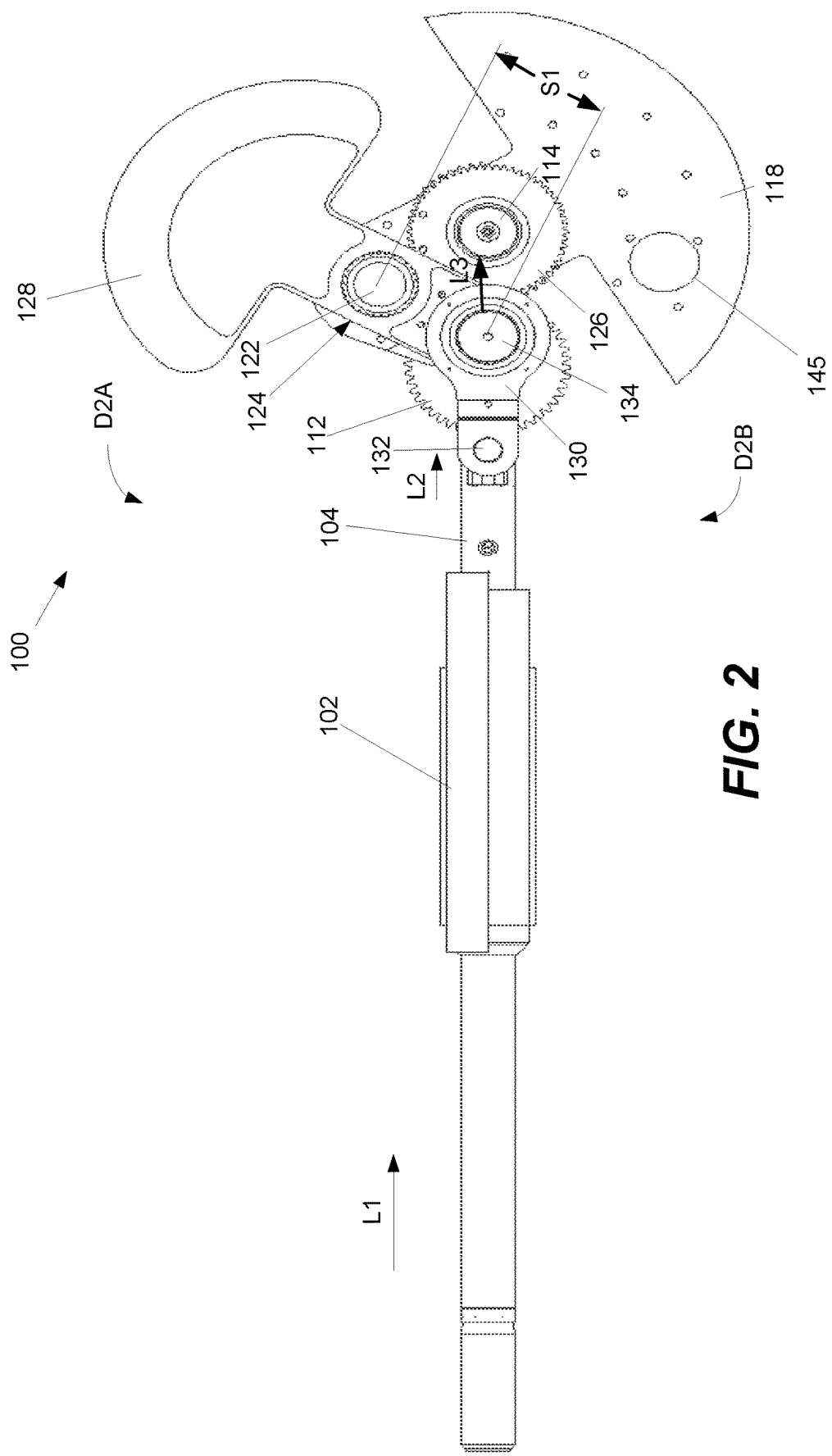
FIG. 2 a side view of the exemplary embodiment of system illustrated in FIG. 1 for converting rotating motion into linear motion.

Referring now to FIG. 2, this figure is a side view of the exemplary embodiment of system 100 of FIG. 1 for converting rotating motion into linear motion. In this FIG. 2, details for the ram connecting link 130 are more visible relative to the view of FIG. 1. In this view, a pin or shaft 134 which couples the ram connecting link 130 to the secondary counterweight 128 is more visible. The pin 134 allows the secondary counterweight 128 to "push" or "pull" the ram 104 as the secondary counterweight 128 translates around the sun gear 126.

According to the exemplary embodiment illustrated in FIG. 2, assume that the input drive gear 112 has the power/energy which is being applied into system 100. With that power being applied to the input drive gear 112, assume that the primary counterweight 118 is being rotated in a clock-wise direction [relative to the view/page as illustrated] as shown by directional arrow D2B. With this clock-wise movement of the primary counterweight 118, the idler gear 136 [not visible in FIG. 2, but see FIG. 3] and the output gear 124 are being translated around the stationary sun gear 126 also in a clockwise fashion consistent with directional arrow D2B.

This translation of the idler gear 136 around the sun gear 126 in a clock-wise direction causes the idler gear 136 to rotate clockwise. This clockwise rotation of the idler gear 136 causes counter-clockwise rotation of the output gear 124 [not visible] and held by shaft 122. The counter-clockwise rotation of the output gear 124 also causes counter-clockwise rotation of the secondary counterweight 128 as shown by directional arrow D2A.

This counter-clockwise rotation of the secondary counterweight 128 causes one end of the secondary counterweight 128 coupled to pin/shaft 134 to move in a linear direction as shown by directional arrow L3. The length dimension S1 of the secondary counterweight 128 between the geometric center of shaft 122 and the geometric center of pin 134 is sized appropriately such that as output gear 124 moves around the sun gear 126 and rotates the secondary counterweight 128, the pin 134 is only moved/translated in a linear direction L3.

The strength of the output gear 124 determines the minimum size for length dimension S1. For use as a power forming press, an exemplary lower limit of S1 is probably about 5.0 inches. An upper limit for the length dimension S1 could be about 24.0 inches or more. One of ordinary skill in the art recognizes that dimensions below and above this exemplary range are possible and are included within the scope of this disclosure.

The pin 134 being moved only in a substantially linear direction also causes the ram connecting link 130 to move to the right of the page and in the linear direction as shown by directional arrow L2, pulling ram 104 via its shaft/pin 132 as shown by directional arrow L1.

As noted previously, the system 100 can easily rotate in the opposite direction relative to the directions described above in connection with FIG. 2 [as well as those directions describe above in connection with FIG. 1]. The opposite direction relative to the direction shown in FIG. 2 could mean that the drive gear 112 could be driven/rotated in an opposite direction than what has been described [i.e. the clockwise direction relative to viewing FIG. 2 from the front].

Similarly, as noted above, the system 100 could convert linear motion to rotational motion. This means power could be applied to the ram 104 and the system 100 could then rotate gear 112 such that the rotation of gear 112 is the resultant output relative to the power being applied into the system 100 by ram 104 and/or by a means 106 for generating linear motion.

The primary counterweight 118 may comprise an aperture 145. This aperture 145 may be sized appropriately to adjust the mass of the primary counterweight 118 and which impacts moment of inertia of the counterweight as well as its axis for rotation as understood by one of ordinary skill in the art. In certain exemplary embodiments, the aperture 145 could be eliminated such that that mass of the primary counterweight 118 is continuous.

Further, the use of an aperture 145/absence of mass is not the only way to control mass and the centroid for the counterweights 118, 128. As understood by one of ordinary skill in the art, the shape of the counterweights 118, 128 can be varied in other ways such as using unequal angle termination or differential thickness throughout a cross-section of each counterweight 118, 128.

Figure 3:
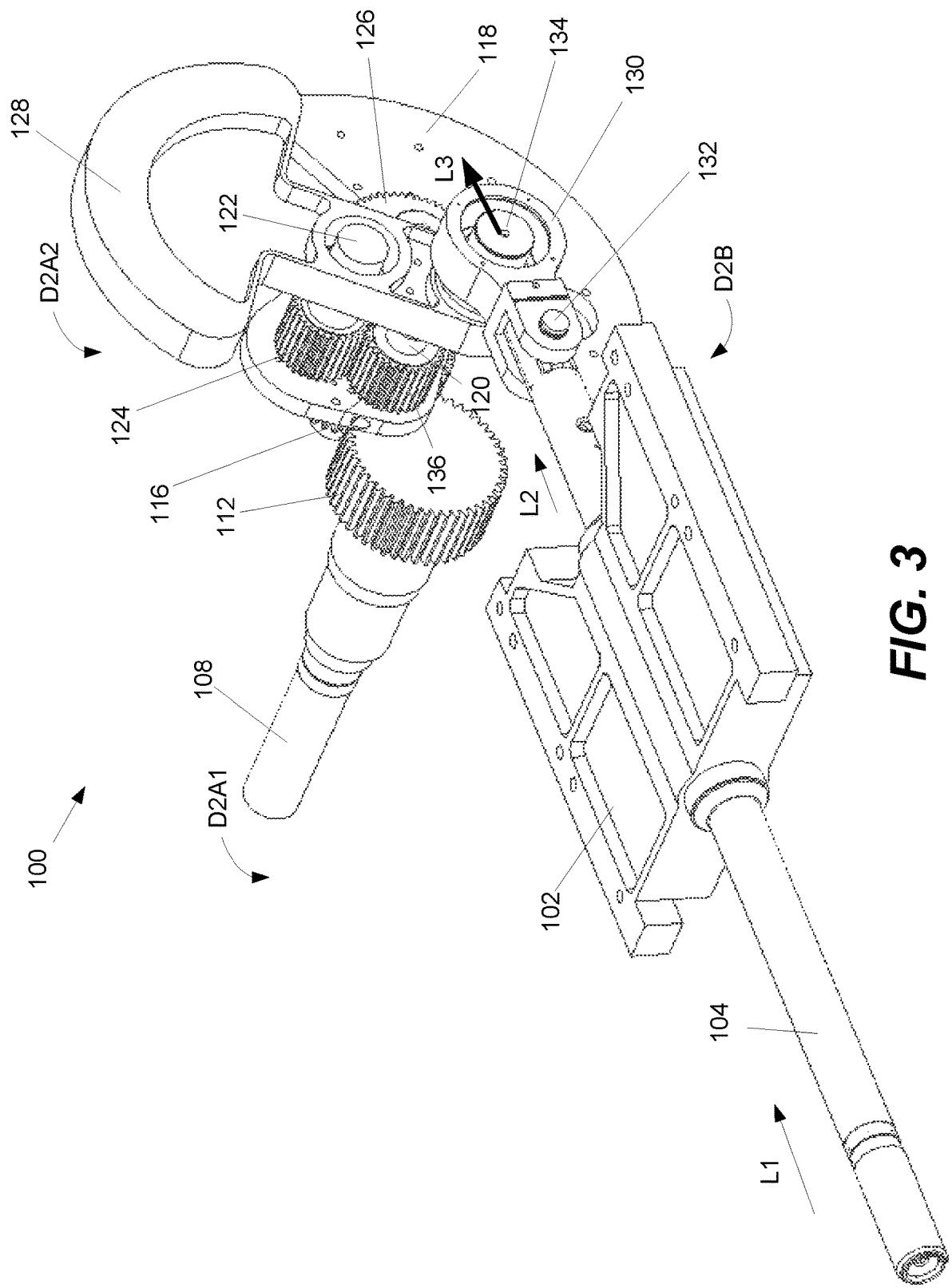
FIG. 3 is another perspective view of the exemplary embodiment of system of FIG. 1 for converting rotating motion into linear motion.

Referring now to FIG. 3, this figure is another perspective view of the exemplary embodiment of system 100 of FIG. 1 for converting rotating motion into linear motion. The directional arrows D2B for the primary counterweight 118, D2A for the secondary counterweight 128, L1 for the shaft 134, L2 and L3 for the ram 104 are consistent with the directions described above in connection with FIG. 2.

In this view of system 100, a directional arrow D2A1 is shown for shaft 108 and the input drive gear 112. Directional arrow D2A1 illustrates counter-clockwise rotation when viewing FIG. 3 such that the ram 104 is on the left side of the input drive gear 112 and the input driven gear 116 is on the right side of the input drive gear 112. Similarly, directional arrow D2A2 of the secondary counterweight illustrates counter-clockwise rotation while directional arrow D2B of the primary counterweight illustrates clockwise rotation.

According to this view in FIG. 3, further details of idler gear 136 are more visible relative to FIG. 1 and FIG. 2. Idler gear 136 was not visible in either FIG. 1 or FIG. 2. As noted previously, idler gear 136 intermeshes with the output gear 124 and the stationary sun gear 126 [not visible completely in FIG. 3, but see FIGS. 1-2]. The idler gear 136 is coupled to shaft 120. Shaft 120 is coupled to/supported by the primary counterweight 118.

In this view of FIG. 3, the relative sizes of the width dimension for several of the gears 112, 124, and 136 are visible. Also, the relative widths/thickness for each of the counterweights 118, 126 are also visible. Similarly, the thickness/width of the ram connecting link 130 relative to the diameter of the ram 104 is also visible.

As noted previously, as the idler gear 136, output gear 124, and primary counterweight 118 are translated around the stationary sun gear 126 in a clockwise direction as shown by directional arrow D2B, this causes the secondary counterweight 128 to rotate in a counter-clockwise direction as shown by directional arrow D2A2. This movement of the secondary counterweight 128 causes its end having the ram connecting pin 134 to move in a linear direction shown by directional arrow L3.

When the ram connecting pin 134 moves in the linear direction L3, it pulls the ram 104 in a rightward, linear direction L2. The ram connecting link 130 will also move in a rightward, linear direction as shown by directional arrow L3. As noted previously in connection with FIG. 2, the length of the secondary counterweight 128 between a geometric center of the shaft 134 and pin 134 is sized such that as the secondary counterweight 128 translates around the stationary sun gear 126 [and while rotating about the shaft 122], the pin 134 is translated/moved in a substantially a linear direction, such as shown by directional arrow L3.

Figure 4:
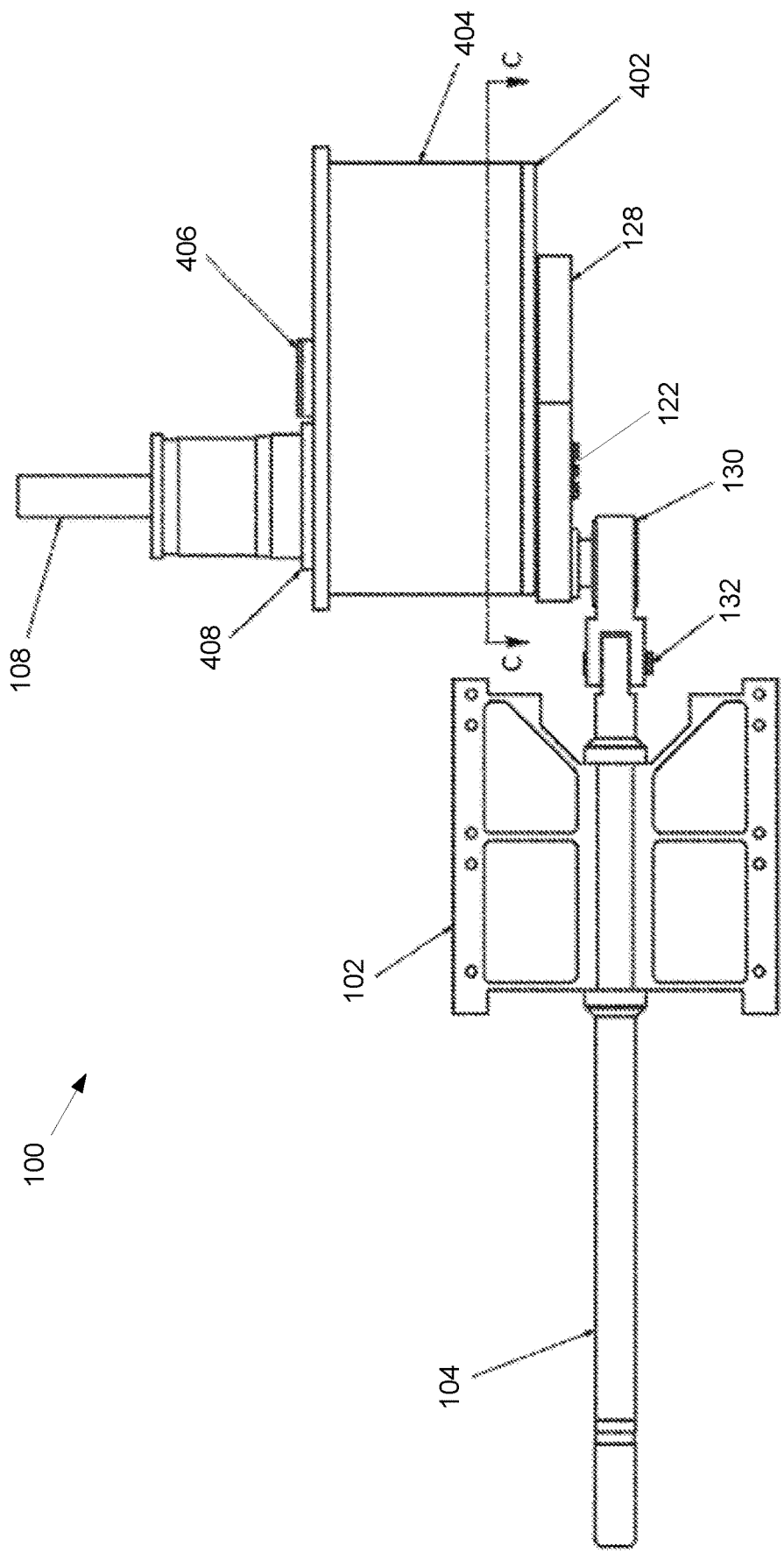
FIG. 4 is a top view of another exemplary embodiment of the system for converting rotating motion into linear motion in which a housing is provided.

Referring now to FIG. 4, this figure illustrates a top view of another exemplary embodiment of the system 100 for converting rotating motion into linear motion in which a housing 404 is provided around several of the moving parts. Specifically, the input driven gear 116, the primary counterweight 118, the idler gear 136, and the output gear 124 are contained within a cylindrically shaped, stationary housing 404.

Meanwhile, the shaft 122 for the output gear 124 [not visible in this figure] is coupled to a rotatable, circular retaining plate 402. As the output gear 124 translates around the sun gear 126, the circular retaining plate 402 rotates with this translational movement of the output gear 124 and its shaft 122.

Attached to the first stationary housing 404 is another, smaller second stationary housing 408 which contains/envelopes components of the rotatable shaft 108 and the corresponding input driven gear 112 [not visible because of the second housing 408 and first housing 404]. Also coupled to the stationary housing 404 is a sealing plate 406.

Referring now to FIG. 5A, this figure illustrates a cross-sectional view of the exemplary embodiment of the system 100 illustrated in FIG. 4 taken along the cut-line C-C of FIG.

4. In this cross-sectional view, the output gear 124, the primary counterweight 118, the idler gear 136, and the sun gear 126 are all visible. These parts are contained/enveloped by the stationary housing 404.

A first end 501 of the primary counterweight 118 is coupled to an inner bearing disk 502. The inner bearing disk 502 is coupled to a first bearing ring 504. The primary counterweight 118, the inner bearing disk 502, and first bearing ring 504 are all securely coupled/fastened together such that these elements are held stationary relative to each other. The primary counterweight 118, the inner bearing disk 502, and first bearing ring 504 all rotate together around the sun gear 126.

Ball bearings 508 provide rotatable support for the first bearing ring 504. The ball bearings 508 are channeled/enveloped by the first bearing ring 504 and a second bearing ring 506. The second bearing ring 506 is securely fastened/coupled to the outer, stationary housing 404. This means that ball bearings 508 and the first bearing ring 504 are free to rotate around the sun gear 126 while the housing 404 and second bearing ring 506 remain fixed/stationary during rotation.

While ball bearing 508 are illustrated in FIG. 4, other bearing types are possible and are included within the scope of this disclosure as understood by one of ordinary skill in the art. Other bearings may include, but are not limited to, plain bearings (that include bushings, journal bearings, sleeve bearings, rifle bearings, and composite bearings); jewel bearings; fluid bearings; magnetic bearings; and flexure bearings, and the like.

A second end 512 of the primary counterweight 118 may support the output gear 124 and the idler gear 136. The second end 512 of the primary counterweight 118 may comprise a section 510 that help holds the shaft 120 [not visible in this figure] for the idler gear 136. While the second end 512 of the primary counterweight 118 may comprise this section 510, it is also possible to form the second end 512 as a unitary structure during manufacturing of the primary counterweight 118.

FIG. 5 also illustrates the relative dimensions for the diameters DR1 of the sun gear 126, diameter DR2 of the idler gear 136, and diameter DR3 of the output gear 124. Diameter DR1 for the sun gear 126 may comprise a magnitude of about 8.4 inches [and having about forty-two teeth], while the diameter DR2 of the idler gear 136 may comprise a magnitude of about 6.4 inches [and having about thirty-two teeth], and the diameter DR3 of the output gear 124 may comprise a magnitude of about 4.2 inches [and having about twenty-one teeth]. However, other magnitudes, greater or smaller, for these diameters [and teeth] are possible and are included within the scope of this disclosure.

Output gear 124 may have a lower limit for its diameter DR3 of about 3.0 inches and an upper limit of about 7.0 inches. Usually, the output gear 124 and sun gear 126 must have a 2:1 ratio/relationship relative to their respective diameters DR3, DR1: the diameter DR1 of the sun gear 126 is generally twice the size of the diameter DR3 for the output gear 124. The diameter DR2 of the idler gear 136 can generally have almost any size.

Meanwhile, a distance DG between geometric centers of the output gear 124 and the sun gear 126 usually comprises about ¼ [one-fourth] of a machine stroke. The dimension or distance S1 between geometric centers of the output gear 124 and pin 134 [SEE FIG. 2 FOR DISTANCE S1] is about 7.0 inches and thus creates a 28.0 inch machine full stroke.

Figure 5B:
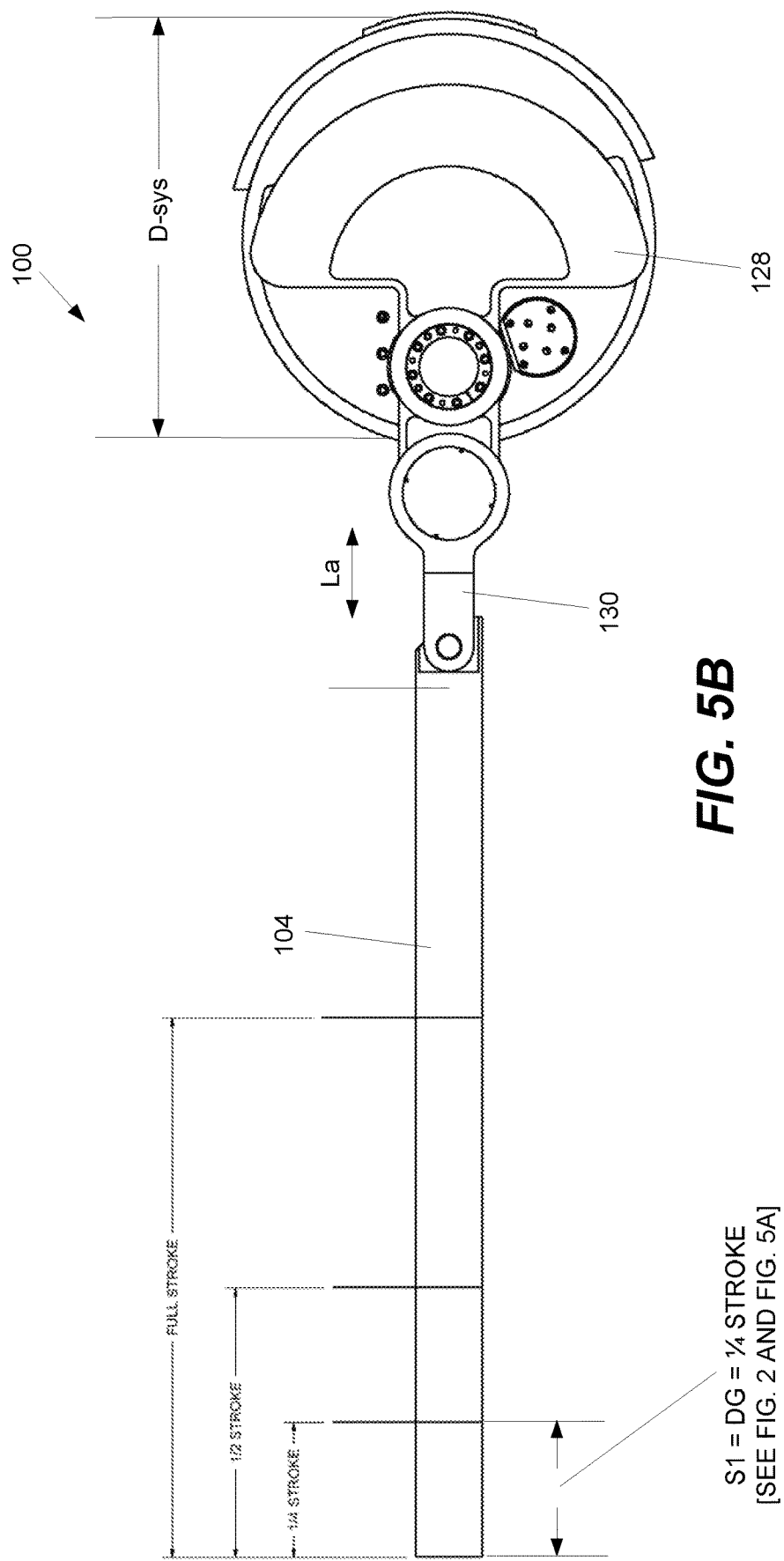
FIG. 5B is a diagram that illustrates a relative distance of a quarter, a half, and a full machine stroke of the system according to one exemplary embodiment.

Referring now to FIG. 5B, this figure is a diagram that illustrates a relative distance of a quarter, a half, and a full machine stroke of the system 100 according to one exemplary embodiment. As understood by one of ordinary skill in the art, the relative dimensions illustrated in FIG. 5B are dependent on the relative sizes of the ram 104 compared to the elements (i.e. gears 114, 124, 126, 136 and counterweights 118, 128) that form diameter D-sys of the system 100.

FIG. 5B further illustrates that distance S1 usually comprises about ¼ [one-fourth] of a machine stroke and is also substantially equal to the center distance DG between the output gear 124 and sun gear 126 described above. This means that one complete machine stroke usually will be four times the size of the distance S1. Distance S1 usually must be larger than (DR1+DR2)/2. The value of (DR1+DR2)/2 also usually must be 0.5 inch larger than S1 to ensure the respective gears do not interfere with one another. These geometrical relationships must be maintained for the pin 134 at the end of the secondary counterweight 128 [and coupling link 130] to track straight line movement shown by directional arrow La.

It is also noted that to obtain static and dynamic balance, the mass of the secondary counterweight 128 usually must be equal to the mass of the ram 104, pin 132, link 130, and pin 134 combined. And a centroid of the secondary counterweight 128 usually must be ¼ [one-fourth] of a machine stroke or the distance S1 from bore where pin 122 attaches. Also, a mass of the elements which move with the primary counterweight 118 [i.e.—the pin 122, the output gear 124, the idler gear 136, the pin 120] combined with a centroid location usually must generate a centripetal force equal to that from the mass of the ram 104 times the maximum linear acceleration rate.

Referring now to FIGS. 6A-6H, these figures illustrate the system 100 for converting rotating motion into linear motion from a single perspective view where each figure illustrates a different position of the counterweights 118, 128 and ram 104 as the input driven gear 116 is rotated. These FIGS. 6A-6H demonstrate the relative motion of the counterweights 118, 128 through eight different positions.

Figure 6A:
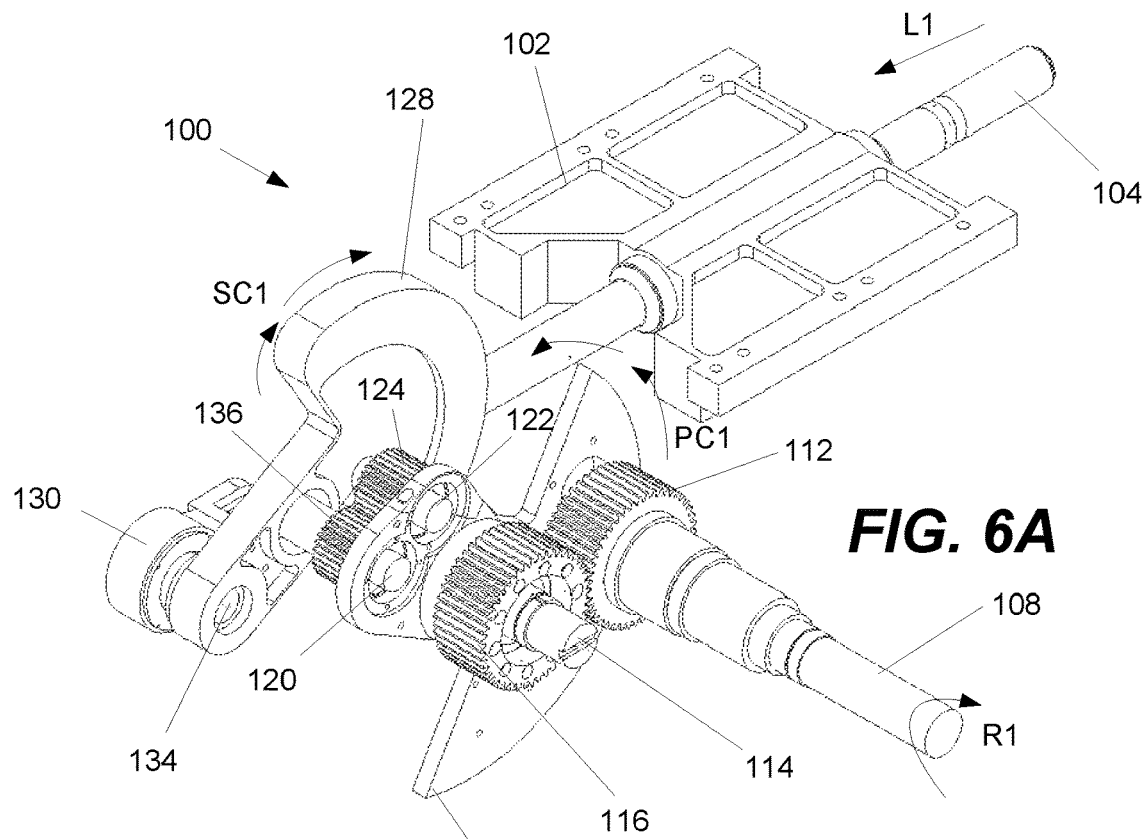
FIG. 6A illustrates the system for converting rotating motion into linear motion from a side perspective view with the counterweights in a first position relative to the positions illustrated in FIGS. 6B-6H.

Referring now to just FIG. 6A, this figure illustrates the system 100 for converting rotating motion into linear motion from a side perspective view with the counterweights 118, 128 in a first position relative to the positions illustrated in FIGS. 6B-6H. According to this exemplary embodiment, the input shaft 108 and the input drive gear 112 are rotated in a clockwise direction as indicated by directional arrow R1. This clockwise rotation of the input driven gear causes the input driven gear 116 to rotate in a counter-clockwise direction. Because the input driven gear 116 is coupled to the primary counterweight 118, the primary counterweight 118 is also rotated in a counter-clockwise direction as shown by directional arrow PC1. The "PC1" designation for this directional arrow also indicates primary counterweight 118 is in a first position.

This counter-clockwise rotation of the primary counterweight 118 and input driven gear 116 causes the idler gear 136 and output gear 124 to translate around the sun gear 126 [not visible in this figure]. The translation of the idler gear 136 around the sun gear 126 [not visible] in a counter-clockwise direction causes the idler gear 136 to rotate in a counter-clockwise direction.

This counter-clockwise rotation of the idler gear 136 rotates the output gear 124 in a clockwise direction as shown by directional arrow SC1. The clockwise rotation of the output gear 124 also causes the secondary counterweight to also rotate in a clockwise direction also shown by directional arrow SC1. The "SC1" designation for this directional arrow also indicates secondary counterweight 128 is in a first position. This movement by the secondary counterweight 128 pulls the ram 104 in a left direction relative to the page as shown by directional arrow L1.

Figure 6B:
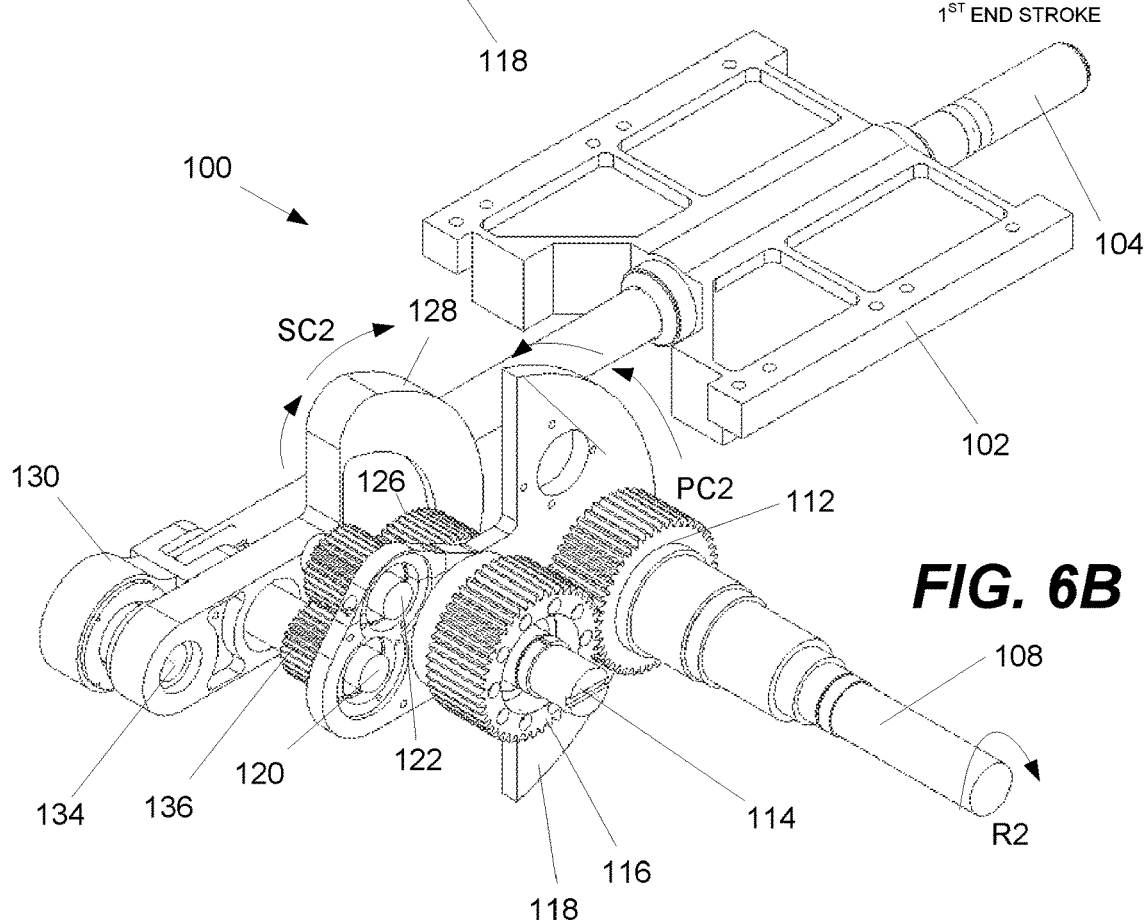
FIG. 6B illustrates the system for converting rotating motion into linear motion from a side perspective view with the counterweights in a second position relative to the positions illustrated in FIG. 6A, and FIGS. 6C-6H.

Referring now to FIG. 6B, this figure illustrates the system 100 for converting rotating motion into linear motion from a side perspective view with the counterweights 118, 128 in a second position relative to the positions illustrated in FIGS. 6A, and 6C-6H. Since FIG. 6B is similar to FIG. 6A, only the differences between FIG. 6B and FIG. 6A will be described below.

The "R2" designation for directional arrow R2 means that the input shaft 108 and corresponding input drive gear 112 have been rotated to a second position relative to the prior figure(s). The "PC2" designation for this directional arrow also indicates primary counterweight 118 is in a second position relative to the prior figure(s). The "SC2" designation for this directional arrow also indicates secondary counterweight 128 is in a second position relative to the prior figure(s).

In FIG. 6B, the secondary counterweight 128 has been rotated such that its end with pin 134 is at a first, leftward maximum displacement relative to the sun gear 126 [now visible in this figure]. This first, leftward maximum displacement of pin 134 relative to the sun gear 126 causes the ram 104 to reach its maximum leftward displacement relative to the sun gear 126. The position of the ram 104 is designated in this FIG. 6B as its first end stroke. Further, and coincidentally, each counterweight 118, 128 is positioned in a similar orientation [lining-up in a parallel fashion] during this "first end stroke" of ram 104.

Figure 6C:
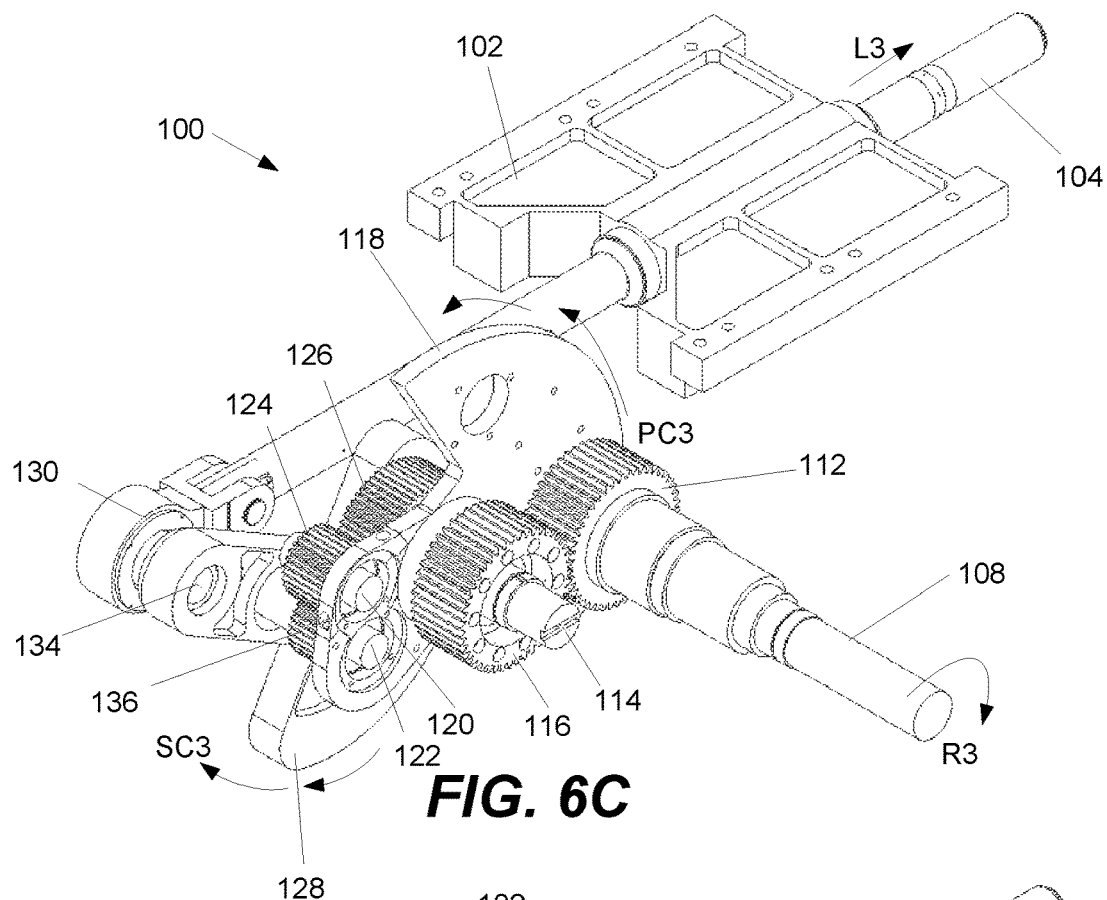
FIG. 6C illustrates the system for converting rotating motion into linear motion from a side perspective view with the counterweights in a third position relative to the positions illustrated in FIGS. 6A-6B, and FIGS. 6D-6H.

Referring now to FIG. 6C, this figure illustrates the system 100 for converting rotating motion into linear motion from a side perspective view with the counterweights 118, 128 in a third position relative to the positions illustrated in FIGS. 6A-6B, and FIGS. 6D-6H. Since FIG. 6C is similar to FIG. 6B, only the differences between FIG. 6B and FIG. 6C will be described below.

The "R3" designation for directional arrow R3 means that the input shaft 108 and corresponding input drive gear 112 have been rotated to a third position relative to the prior figure(s). The "PC3" designation for this directional arrow also indicates primary counterweight 118 is in a third position relative to the prior figure(s).

The "SC3" designation for this directional arrow also indicates secondary counterweight 128 is in a third position relative to the prior figure(s). In this FIG. 6C relative to FIG. 6B, the pin 134 supporting the ram connecting link 130 has started being pushed in a rightward direction, which in turn, pushes the ram 104 in a rightward direction as indicated by directional arrow L3.

Figure 6D:
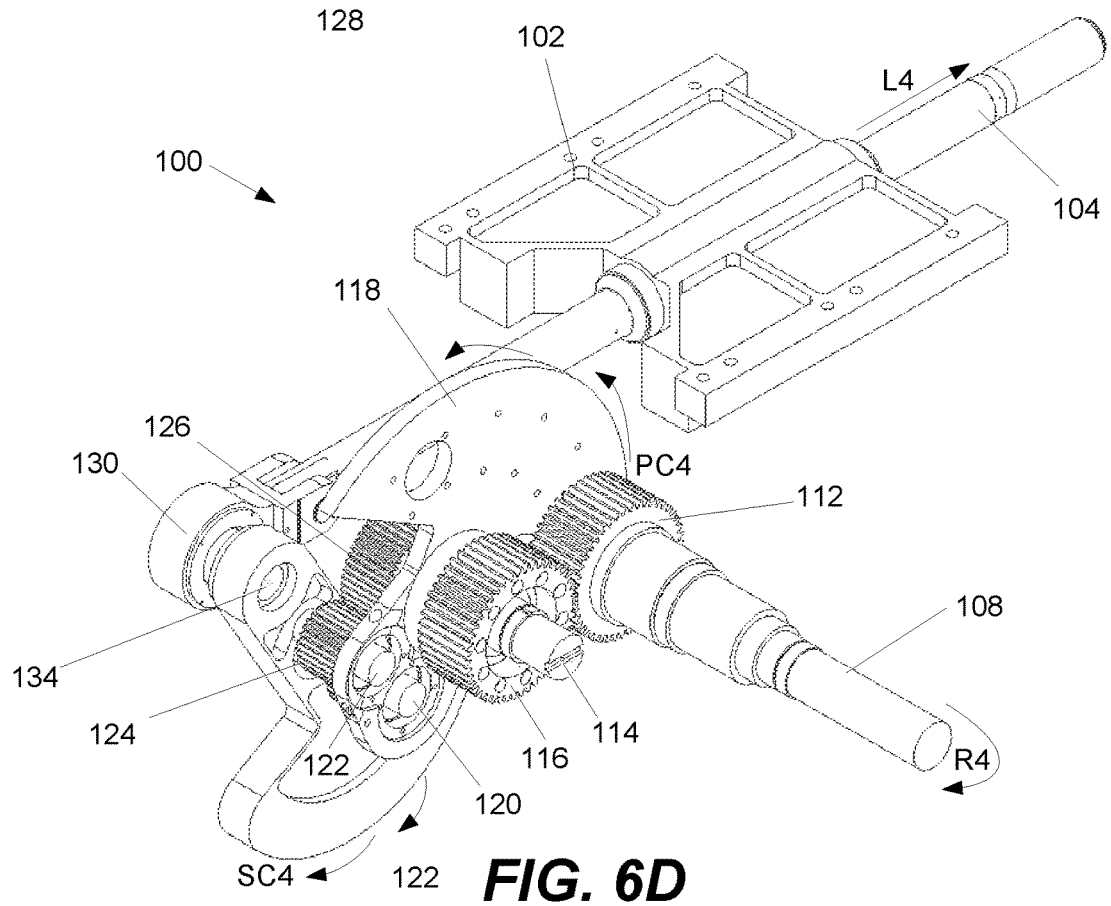
FIG. 6D illustrates the system for converting rotating motion into linear motion from a side perspective view with the counterweights in a fourth position relative to the positions illustrated in FIGS. 6A-6C, and FIGS. 6E-6H.

Referring now to FIG. 6D, this figure illustrates the system 100 for converting rotating motion into linear motion from a side perspective view with the counterweights 118, 128 in a fourth position relative to the positions illustrated in FIGS. 6A-6C, and FIGS. 6E-6H. Since FIG. 6D is similar to FIG. 6C, only the differences between FIG. 6D and FIG. 6C will be described below.

The "R4" designation for directional arrow R4 means that the input shaft 108 and corresponding input drive gear 112 have been rotated to a fourth position relative to the prior figure(s). The "PC4" designation for this directional arrow also indicates primary counterweight 118 is in a fourth position relative to the prior figure(s).

The "SC4" designation for this directional arrow also indicates secondary counterweight 128 is in a fourth position relative to the prior figure(s). In this FIG. 6D relative to FIG. 6C, the pin 134 supporting the ram connecting link 130 continues to be pushed in a rightward direction, which in turn, pushes the ram 104 in a rightward direction as indicated by directional arrow L4. Note that the directional arrow L4 has a length greater than a length of the directional arrow L3 of FIG. 6C to show that the ram 104 has extended further in the rightward direction relative to bearing 104 and compared to the position of the ram 104 illustrated FIG. 6C.

Figure 6E:
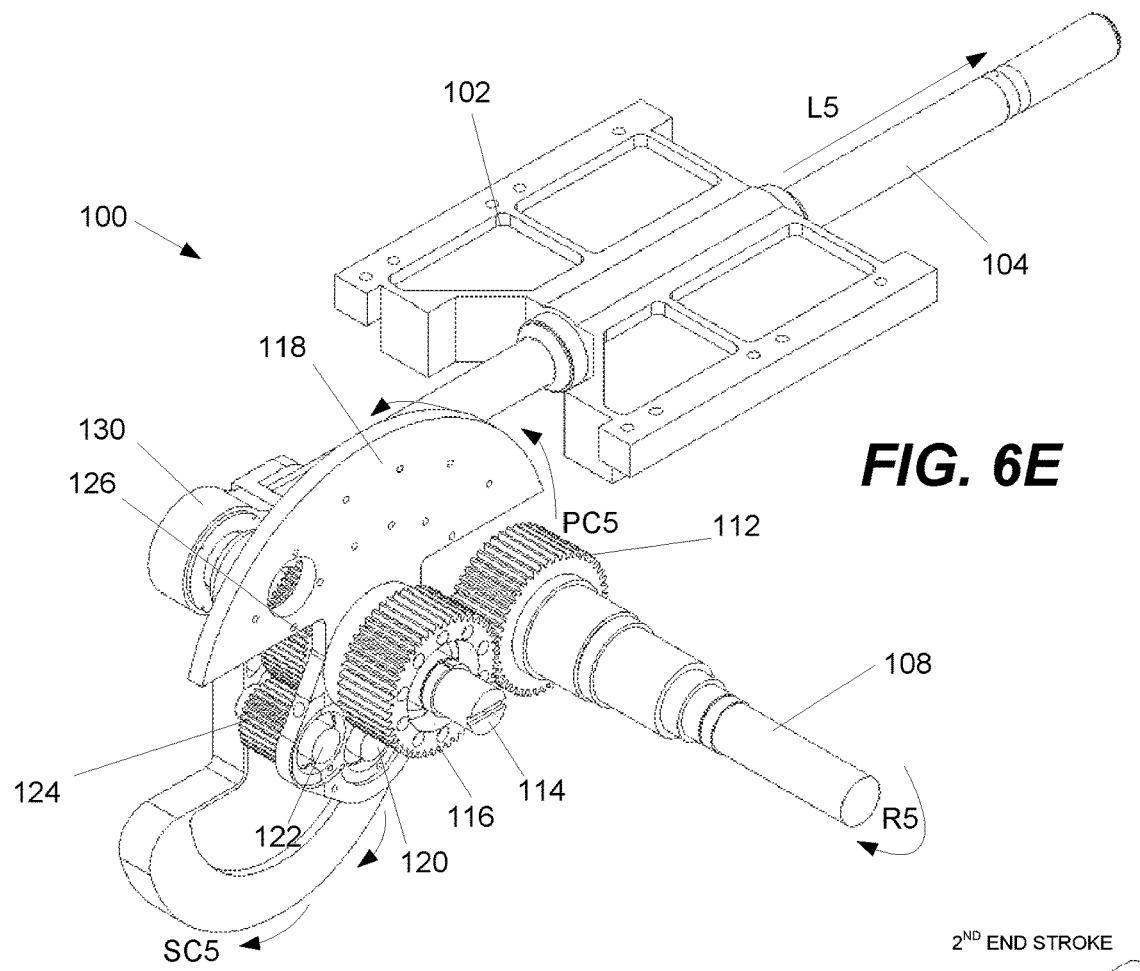
FIG. 6E illustrates the system for converting rotating motion into linear motion from a side perspective view with the counterweights in a fifth position relative to the positions illustrated in FIGS. 6A-6D, and FIGS. 6F-6H.

Referring now to FIG. 6E, this figure illustrates the system 100 for converting rotating motion into linear motion from a side perspective view with the counterweights 118, 128 in a fifth position relative to the positions illustrated in FIGS. 6A-6D, and FIGS. 6F-6H. Since FIG. 6E is similar to FIG. 6D, only the differences between FIG. 6D and FIG. 6E will be described below.

The "R5" designation for directional arrow R5 means that the input shaft 108 and corresponding input drive gear 112 have been rotated to a fifth position relative to the prior figure(s). The "PC5" designation for this directional arrow also indicates primary counterweight 118 is in a fifth position relative to the prior figure(s).

The "SC5" designation for this directional arrow also indicates secondary counterweight 128 is in a fifth position relative to the prior figure(s). In this FIG. 6E relative to FIG. 6D, the pin 134 [not visible] supporting the ram connecting link 130 continues to be pushed in a rightward direction, which in turn, pushes the ram 104 in a rightward direction as indicated by directional arrow L5. Note that the directional arrow L5 has a length greater than a length of the directional arrow L4 of FIG. 4 to show that the ram 104 has extended further in the rightward direction relative to bearing 104 and compared to the position of the ram 104 illustrated FIG. 4.

Figure 6F:
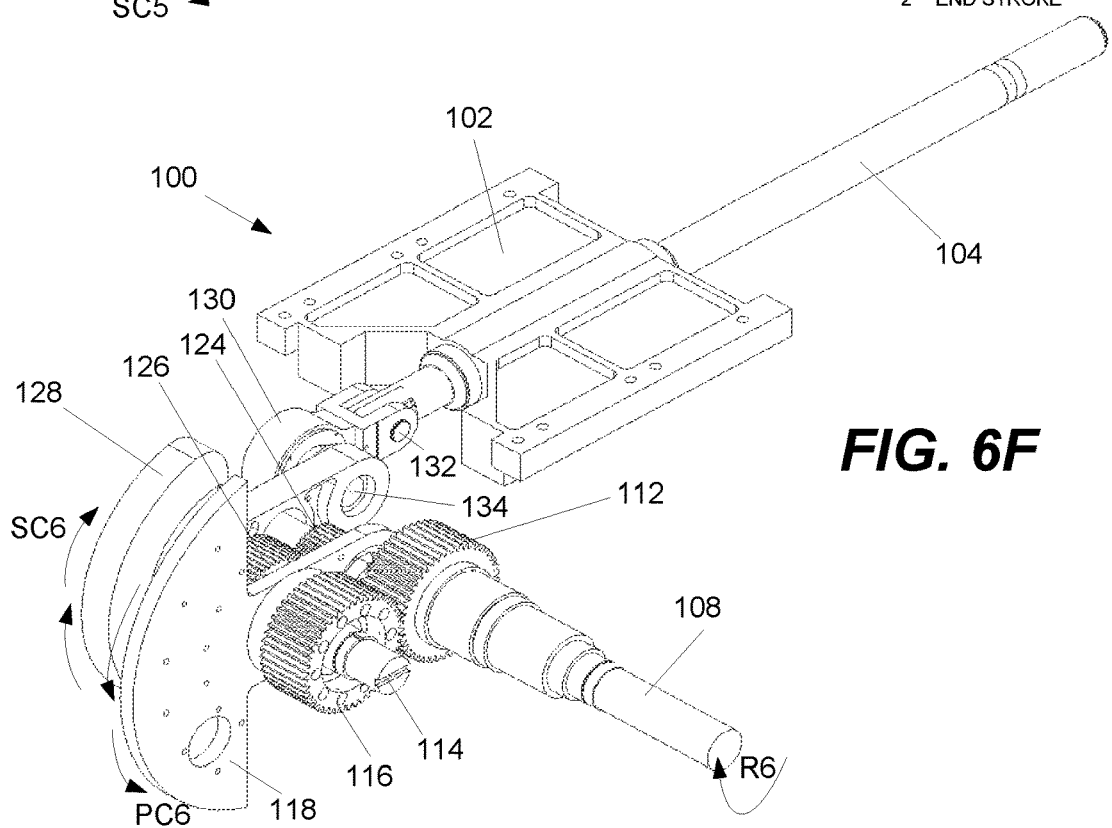
FIG. 6F illustrates the system for converting rotating motion into linear motion from a side perspective view with the counterweights in a sixth position relative to the positions illustrated in FIGS. 6A-6E, and FIGS. 6G-6H.

Referring now to FIG. 6F, this figure illustrates the system 100 for converting rotating motion into linear motion from a side perspective view with the counterweights 118, 128 in a sixth position relative to the positions illustrated in FIGS. 6A-6E, and FIGS. 6G-6H. Since FIG. 6F is similar to FIG. 6E, only the differences between FIG. 6E and FIG. 6F will be described below.

The "R6" designation for directional arrow R6 means that the input shaft 108 and corresponding input drive gear 112 have been rotated to a sixth position relative to the prior figure(s). The "PC6" designation for this directional arrow also indicates primary counterweight 118 is in a sixth position relative to the prior figure(s). The "SC6" designation for this directional arrow also indicates secondary counterweight 128 is in a sixth position relative to the prior figure(s).

In FIG. 6F, the secondary counterweight 128 has been rotated such that its end with pin 134 is at a second, yet rightward maximum displacement relative to the sun gear 126 [visible in this figure]. This second, rightward maximum displacement of pin 134 relative to the sun gear 126 causes the ram 104 to reach its maximum rightward displacement relative to the sun gear 126. The position of the ram 104 is designated in this FIG. 6F as its second end stroke. Further, and coincidentally, each counterweight 118, 128 is positioned in a similar orientation [lining-up in a parallel fashion] during this "second end stroke" of ram 104.

Figure 6G:
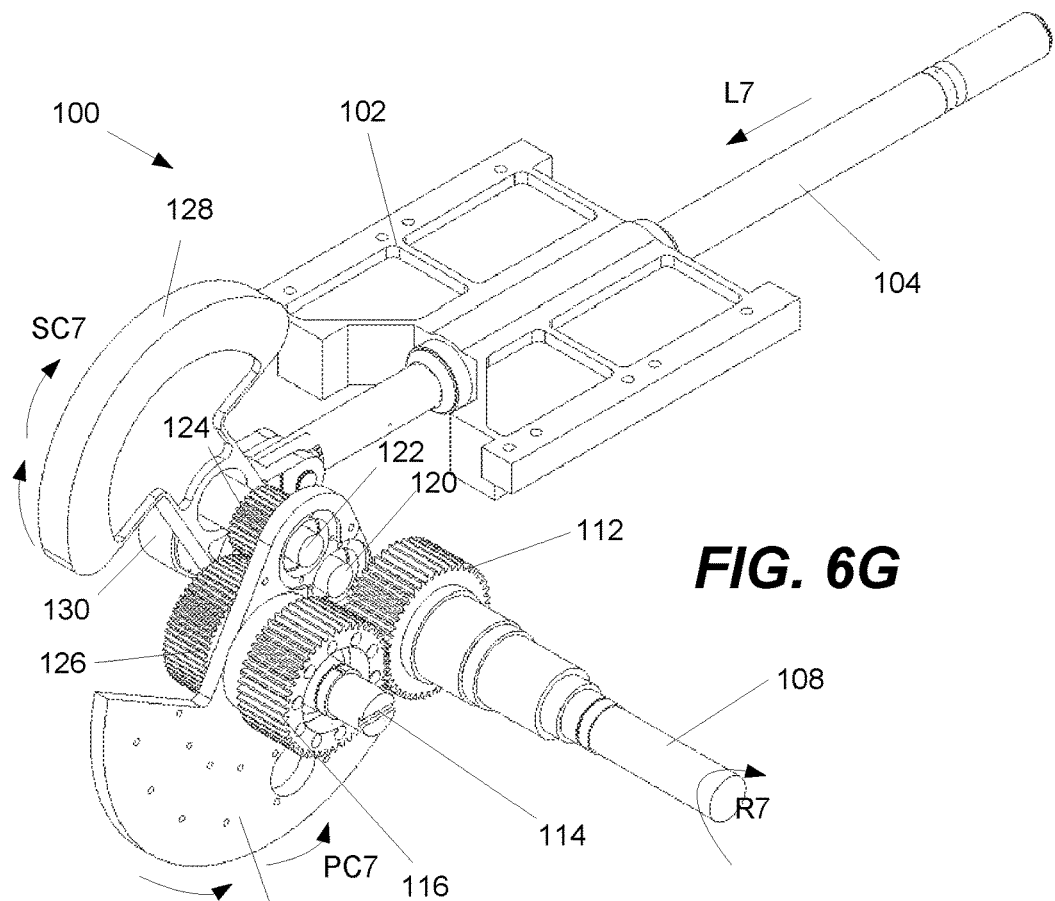
FIG. 6G illustrates the system for converting rotating motion into linear motion from a side perspective view with the counterweights in a seventh position relative to the positions illustrated in FIGS. 6A-6F, and FIG. 6H.

Referring now FIG. 6G, this figure illustrates the system 100 for converting rotating motion into linear motion from a side perspective view with the counterweights 118, 128 in a seventh position relative to the positions illustrated in FIGS. 6A-6F, and FIG. 6H. Since FIG. 6G is similar to FIG. 6H, only the differences between FIG. 6H and FIG. 6G will be described below.

The "R7" designation for directional arrow R5 means that the input shaft 108 and corresponding input drive gear 112 have been rotated to a seventh position relative to the prior figure(s). The "PC7" designation for this directional arrow also indicates primary counterweight 118 is in a seventh position relative to the prior figure(s).

The "SC7" designation for this directional arrow also indicates secondary counterweight 128 is in a seventh position relative to the prior figure(s). In this FIG. 6G relative to FIG. 6H, the pin 134 [not visible] supporting the ram connecting link 130 is pulled in a leftward direction, which in turn, pulls the ram 104 in a leftward direction as indicated by directional arrow L7.

Figure 6H:
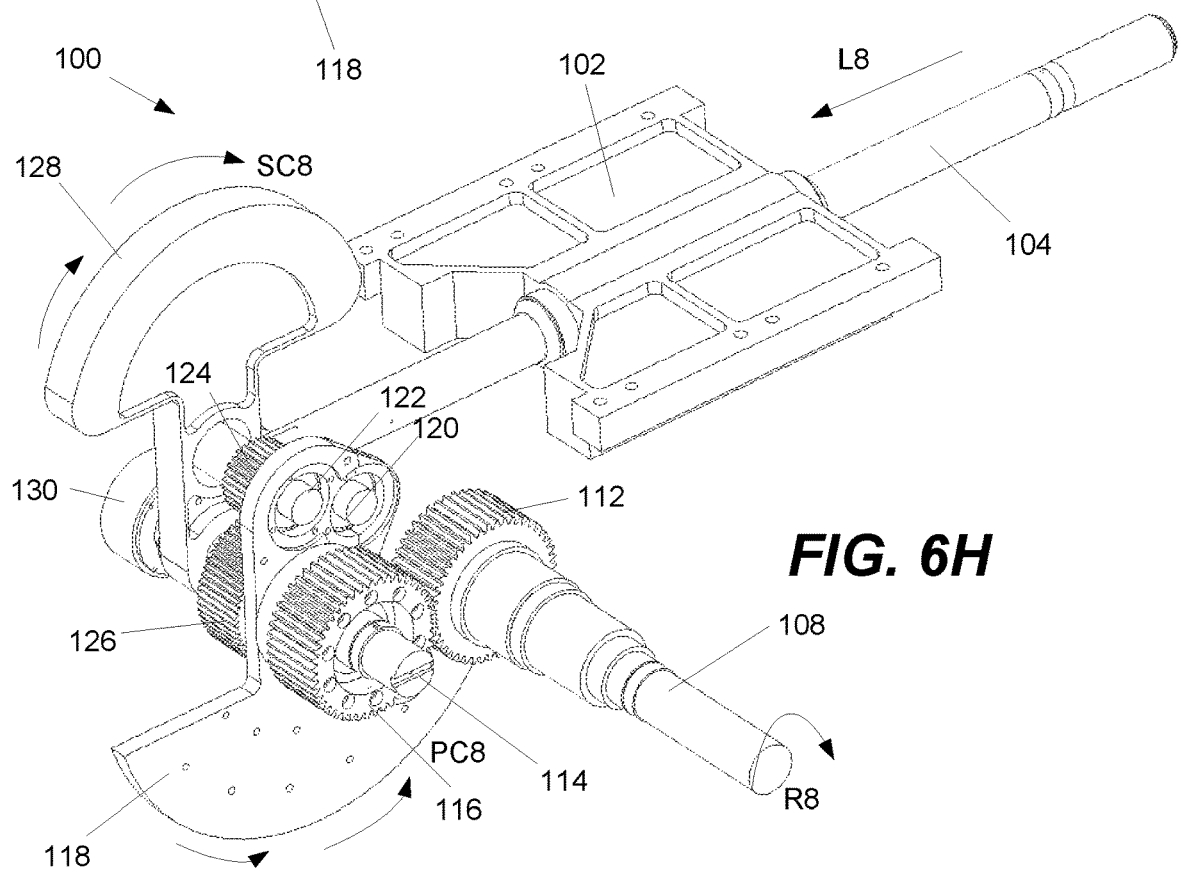
FIG. 6H illustrates the system for converting rotating motion into linear motion from a side perspective view with the counterweights in an eighth position relative to the positions illustrated in FIGS. 6A-6G.

FIG. 6H illustrates the system 100 for converting rotating motion into linear motion from a side perspective view with the counterweights 118, 128 in an eighth position relative to the positions illustrated in FIGS. 6A-6G. Since FIG. 6H is similar to FIG. 6G, only the differences between FIG. 6G and FIG. 6H will be described below.

The "R8" designation for directional arrow R8 means that the input shaft 108 and corresponding input drive gear 112 have been rotated to an eighth position relative to the prior figure(s). The "PC8" designation for this directional arrow also indicates primary counterweight 118 is in an eighth position relative to the prior figure(s).

The "SC8" designation for this directional arrow also indicates secondary counterweight 128 is in an eighth position relative to the prior figure(s). In this FIG. 6H relative to FIG. 6G, the pin 134 [not visible] supporting the ram connecting link 130 is pulled in a leftward direction, which in turn, pulls the ram 104 in a leftward direction as indicated by directional arrow L8.

Note that the directional arrow L8 has a length greater than a length of the directional arrow L7 of FIG. 6G to show that the ram 104 has extended further in the rightward direction relative to bearing 104 and compared to the position of the ram 104 illustrated FIG. 6G. It is further noted that the pin 134 [not visible] and output gear 124 relative to the sun gear 126 are at a midpoint relative to the first end stroke of FIG. 6B and the second end stroke of FIG. 6F. This also means ram 104 is at a midpoint in FIG. 6H relative to the first end stroke position illustrated in FIG. 6B and the second end stroke position illustrated in FIG. 6H.

Figure 6I:
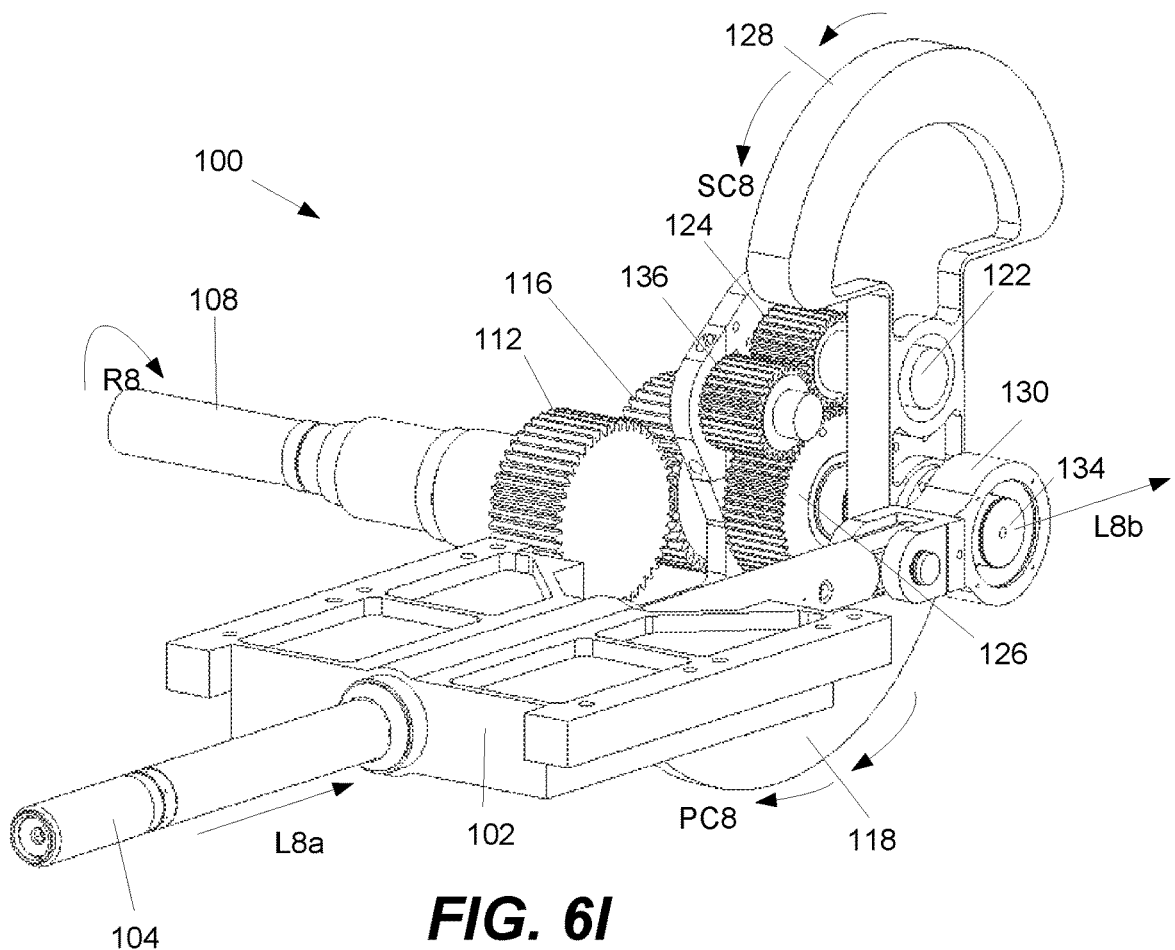
FIG. 6I illustrates the system for converting rotating motion into linear motion from a reverse-side perspective view relative to FIG. 6H with the counterweights in the eighth position.

Referring now to FIG. 6I, this figure illustrates the system 100 for converting rotating motion into linear motion from a reverse-side perspective view relative to FIG. 6H with the counterweights 118, 128 in the eighth position. Since FIG. 6I is similar to FIG. 6H, only the differences between FIG. 6H and FIG. 6I will be described below. From the reverse-side perspective view 6I, the sun gear 126, ram connecting link 130, and shaft 122 are more readily seen compared to the view of FIG. 6H.

In this FIG. 6I, the ram 104 is shown to be moving in the rightward, linear direction relative to the page as shown by directional arrow L8a. The directional arrow L8b shows the rightward, linear direction of the pin 134 for the ram connecting link 130. As noted previously, the secondary counterweight 128 is sized appropriately such that despite its rotation caused by output gear 124 and by its translational movement from the primary counterweight 118 around the sun gear 126, the end portion containing the pin 134 moves in a substantially linear direction such as indicated by directional arrow L8b.

Figure 6J:
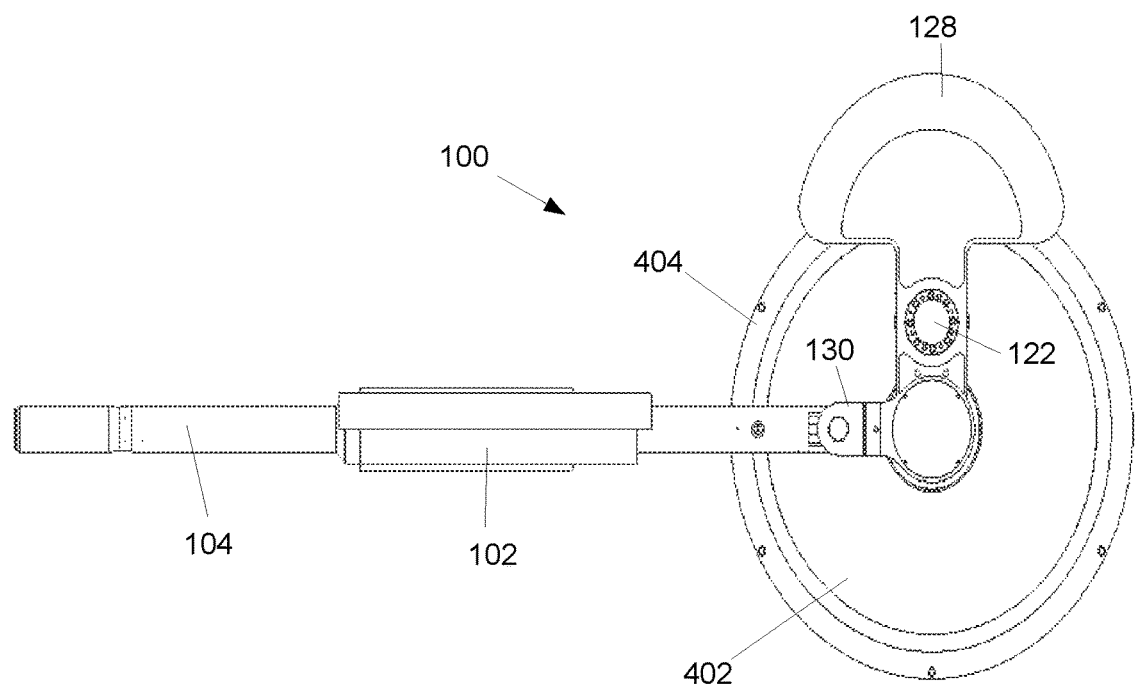
FIG. 6J illustrates the system 100 for converting rotating motion into linear motion from a side view relative to FIG. 6I with the counterweight in the eighth position and having the bearing retainer and housing, similar to the embodiment illustrated in FIG. 4 which also has the housing.

Referring now to FIG. 6J, this figure illustrates the system 100 for converting rotating motion into linear motion from a side view relative to FIG. 6I with the counterweight 128 in the eighth position and having the bearing retainer 402 and housing 404, similar to the embodiment illustrated in FIG. 4 which also has the housing 404. In this view of FIG. 6J, the output gear 124, idler gear 136, sun gear 126, and input drive gear 116 are not visible because of the bearing retainer 402 and housing 404 which envelopes/encases these elements.

Also with this position of the secondary counterweight 128 and its shaft 122 that supports the output gear 124 [not visible], the ram 108 and ram connecting link 130 are at a mid-stroke position such that ram 108 is extended at a midpoint relative to the translational movement that it has through bearing 102. This midpoint position of ram 104 I FIG. 6J is identical to the midpoint position for ram 104 as illustrated in FIG. 6J.

Figure 7:
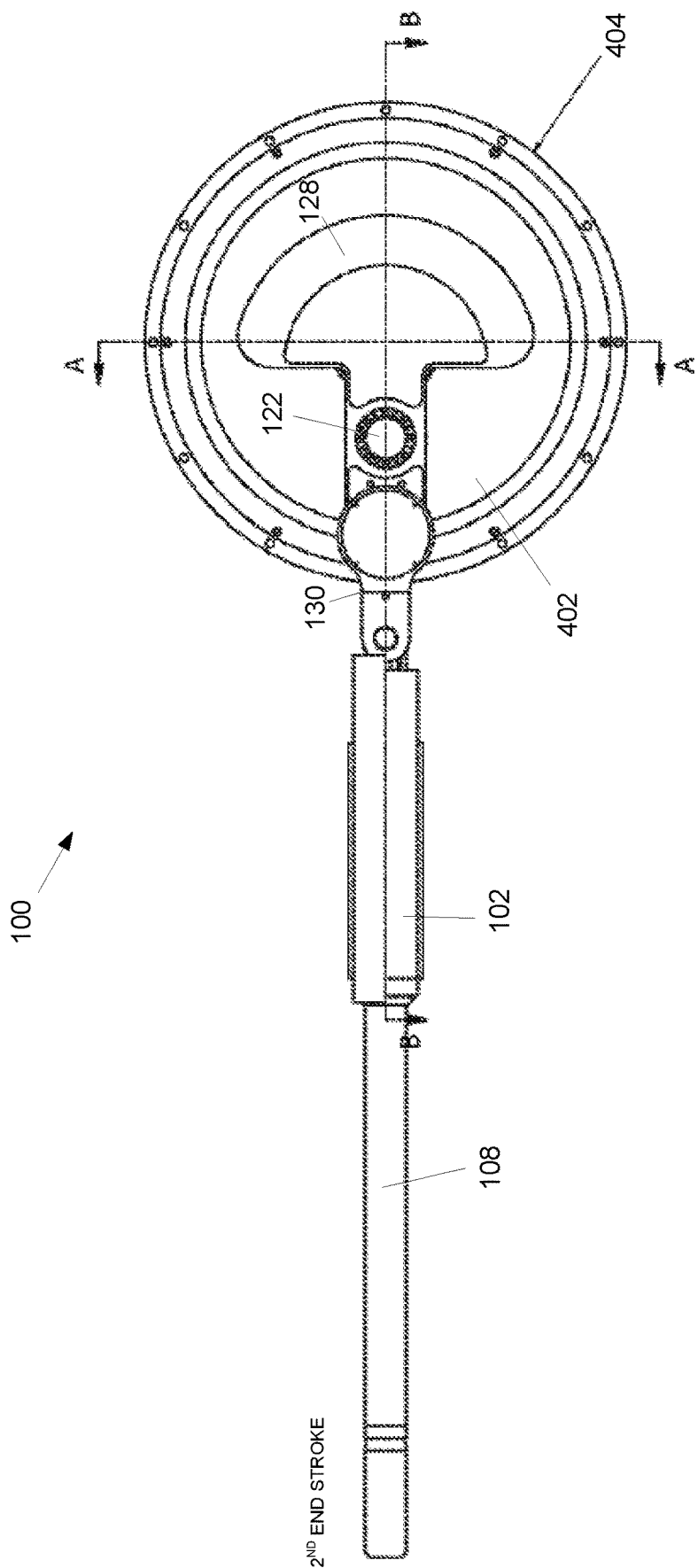
FIG. 7 is another side view of the system for converting rotating motion into linear motion relative to FIG. 6J but the secondary counterweight is in a position where the ram is at its second end stroke, like that illustrated in FIG. 6F.

Referring now to FIG. 7, this figure is another side view of the system 100 for converting rotating motion into linear motion relative to FIG. 6J but the secondary counterweight 128 is in a position where the ram 104 is at its second end stroke, like that illustrated in FIG. 6F. FIG. 7 also illustrates section cut line A-A and line B which correspond to the cross-sectional views illustrated in FIG. 8 and FIG. 9 described in further detail below.

Figure 8:
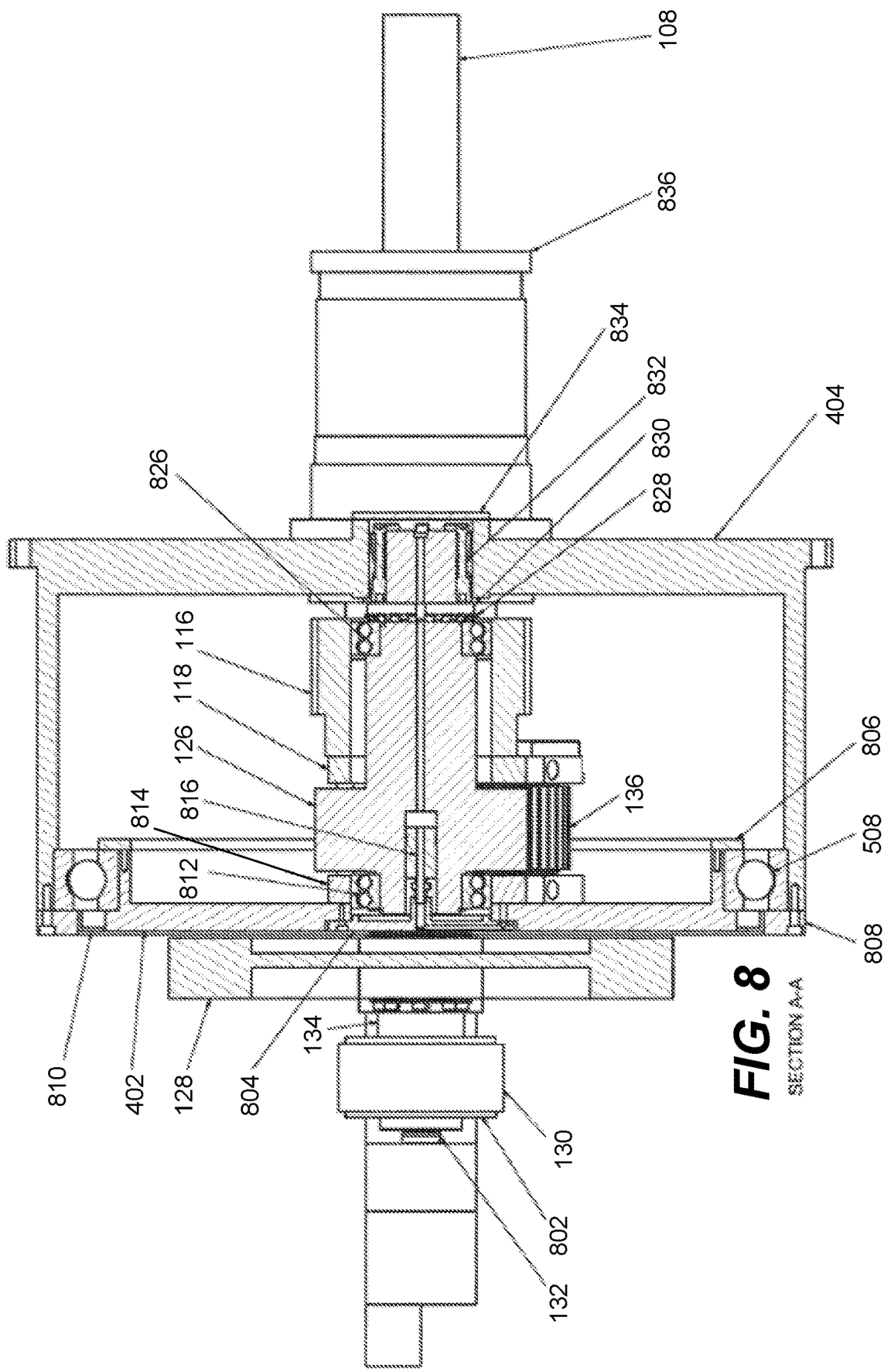
FIG. 8 is a cross-sectional view of the exemplary embodiment of the system illustrated in FIG. 7 taken along the cut-line A-A of FIG. 7.

Referring now to FIG. 8, this figure is a cross-sectional view of the exemplary embodiment of the system 100 illustrated in FIG. 7 taken along the cut-line A-A of FIG. 7. In this figure, a link bearing cap 802 is visible and which covers an end section of the shaft/pin 134. Also visible is a sun gear bearing cap 804.

Near the outer edge of housing 404 is ball bearing 508 which has a first bearing retainer 806. A second bearing retainer 808 is positioned on an opposite side of the ball bearing 508 relative to the first bearing retainer 806. Adjacent to the second bearing retainer is an oil seal 810 which is identified at the top section near an upper ball bearing 508.

Next, the elements adjacent to the sun gear 126 and input driven gear 116 will be described. A tapered roller bearing 812 supports a section 814 of the secondary counterweight 128. Within an inner section of the sun gear 126 is a rotary union 816.

In the middle of the input driven gear 116, a tapered roller bearing 826 is provided. Adjacent to the tapered rolling bearing 826 is a bearing lockwasher 828. Next to the bearing lockwasher 828 is a bearing lock nut 830. A ring feder 832 is positioned adjacent to the bearing lock nut 830. And adjacent to the ring feder 832 is a housing sealing plate 834. Opposite to the housing sealing plate 824 is the sealing plate 836 for the input drive shaft 108.

Figure 9:
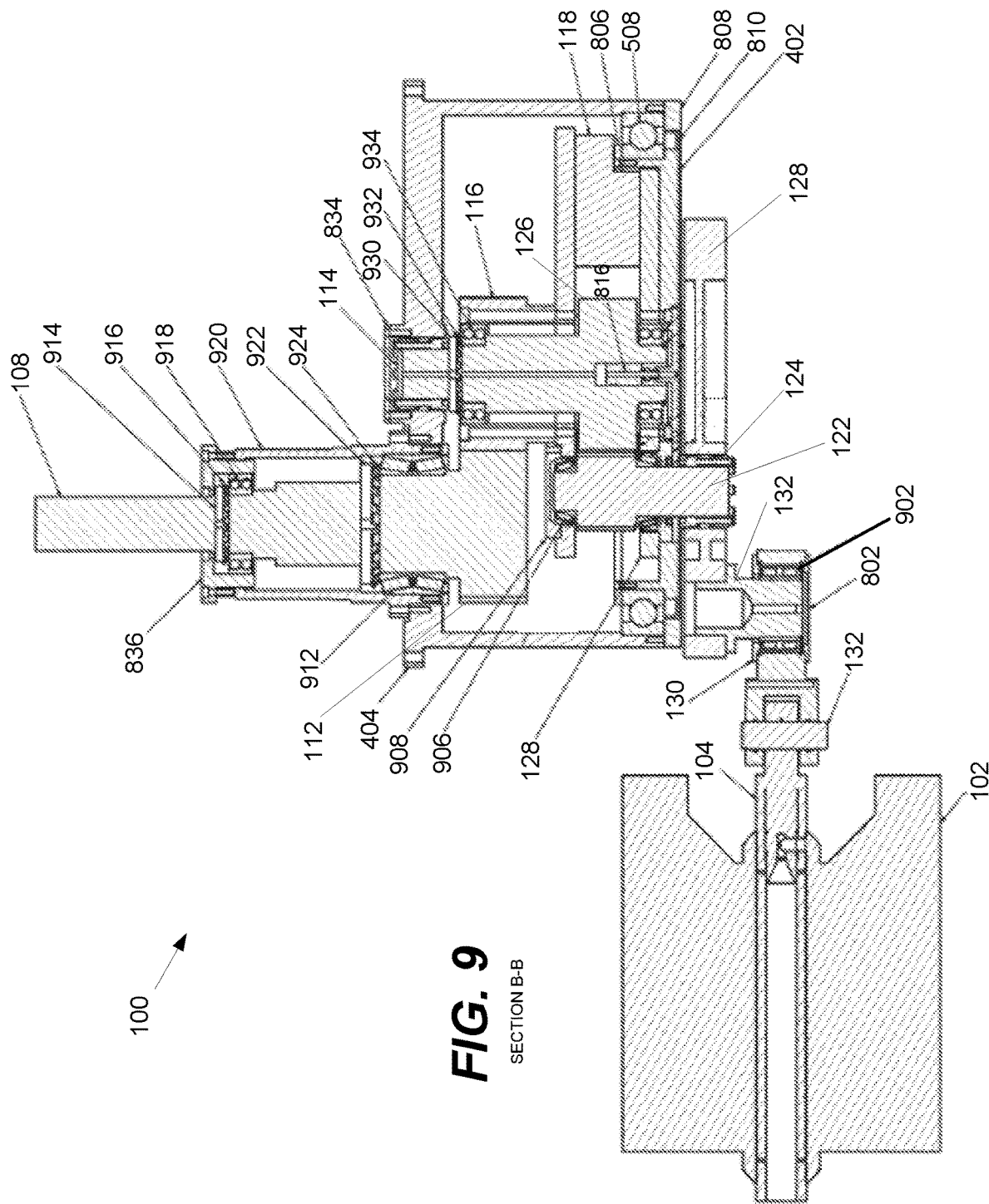
FIG. 9 is a cross-sectional view of the exemplary embodiment of the system illustrated in FIG. 7 taken along the cut-line B-B of FIG. 7.

Referring now to FIG. 9, this is a cross-sectional view of the exemplary embodiment of the system 100 illustrated in FIG. 7 taken along the cut-line B-B of FIG. 7. In this FIG. 9, a bearing 902 which supports the pin/shaft 132 is visible. This bearing 902 may comprise a double-row ball bearing, however, other bearings may be employed as understood by one of ordinary skill in the art.

Also visible in FIG. 9 is a bearing tapered roller 906 which rotatably supports the shaft 122. As noted previously, shaft 122 supports secondary counterweight 128. Adjacent to the roller 906 is a housing 908.

Another bearing tapered roller 912 rotatably supports input drive gear 112. And further up the shaft 108 relative to the input drive gear 112 is a bearing lock tan 914. Adjacent to the bearing lock nut tan 914 is a bearing lockwasher 916. Next to the lockwasher 916 is another bearing tapered roller 918. A housing 920 encases/envelopes at least the tapered roller 912, bearing lock tan 914, lockwasher 916, and tapered roller 918. The housing 920 also encases/protects another bearing locknut tan 922 and a bearing lockwasher 924. The shaft 114 for input driven gear 116 is rotatably supported by a bearing lock nut tan 930, a bearing lockwasher 932, and a bearing tapered roller 934.

Figure 10:
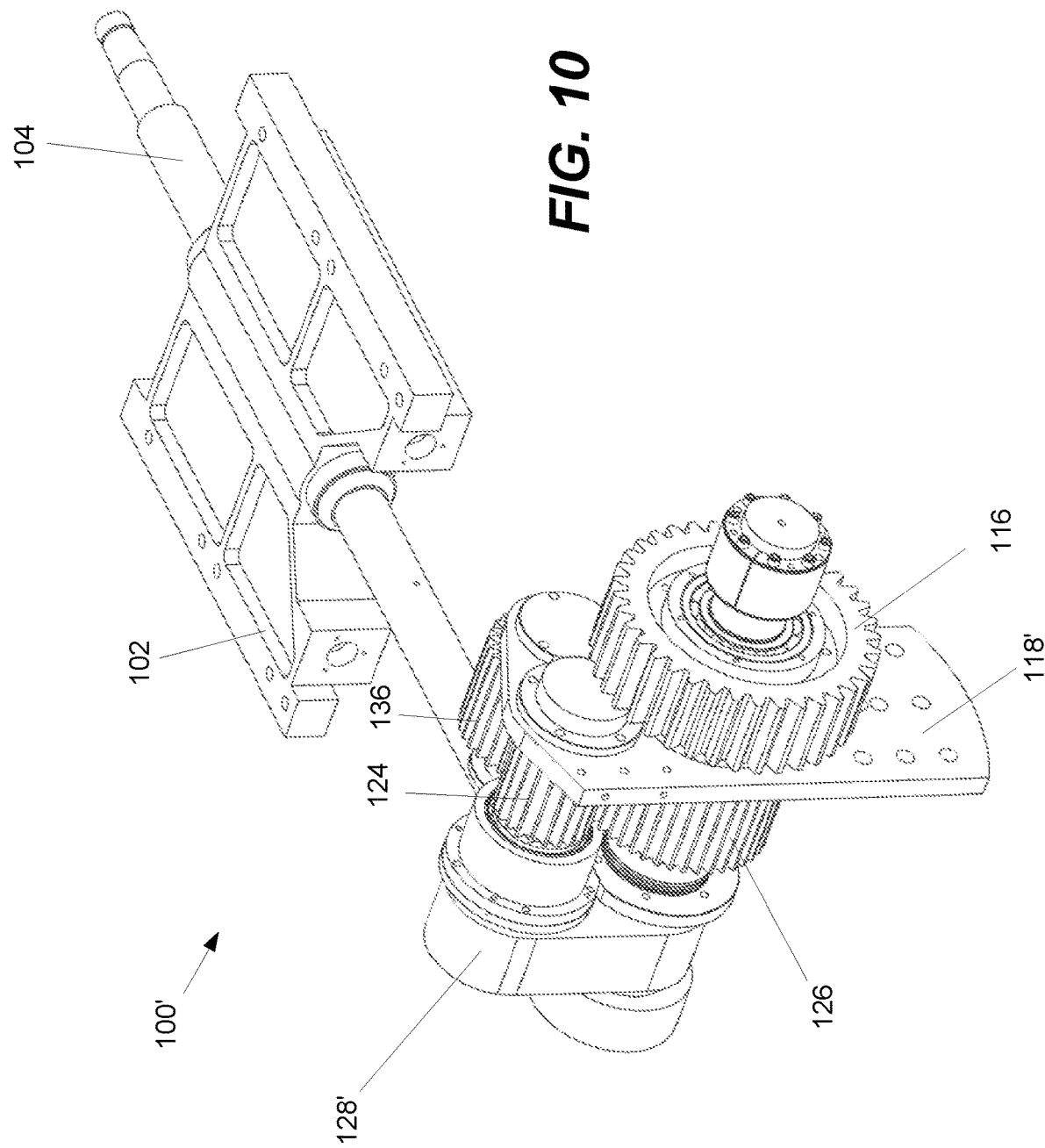
FIG. 10 is a side perspective view of alternate exemplary embodiment of a system 100' (prime) for converting rotating motion into linear motion.

As noted previously, various different bearings may be employed in system 100 without departing from the scope of this disclosure as understood by one of ordinary skill in the art. While several of the bearings illustrated in FIGS. 8-9 may comprise roller bearings, other types of bearings are possible. Other bearings may include, but are not limited to, plain bearings (that include bushings, journal bearings, sleeve bearings, rifle bearings, and composite bearings); jewel bearings; fluid bearings; magnetic bearings; and flexure bearings, and the like Referring now to FIG. 10, this figure is a side perspective view of alternate exemplary embodiment of a system 100' (prime) for converting rotating motion into linear motion. This FIG. 10 is very similar to FIG. 1 so only the differences will be described below. In this FIG. 10, the system 100' has a modified primary counterweight 118' and a modified secondary counterweight 128'.

Specifically, the primary counterweight 118' has been modified such that it does not have a larger bottom portion [the sector shaped section] compared to the primary counterweight 118 illustrated in FIGS. 1-9. Similarly, the secondary counterweight 128' also does not have a larger bottom portion [the sector shaped section] compared to the secondary counterweight 128 of FIGS. 1-9.

The system 100' may function without the sector shaped sections for each counterweight 118', 128'. However, high foundation and vibration forces may be created in this alternate system 100' having the modified counterweights 118', 128'. The additional weighting provided in the counterweights 118, 128 of FIGS. 1-9 help provide for more constant energy.

The additional weights/mass of the counterweights of FIGS. 1-9 statically and dynamically balance the system 100. Other systems for converting rotating motion to linear motion are usually limited to approximately 400.0 strokes per minute. Meanwhile, the constant energy and weight balance of the system 100 illustrated in FIGS. 1-9 allows the system 100 to operate as fast as about 1000.0 strokes per minute. Thus, the alternate system 100' shown with the size-reduced counterweights 118', 128' may function, but it may not function as efficiently as the exemplary embodiments illustrated in FIGS. 1-9 where the energy and weighting are balanced.

Figure 11:
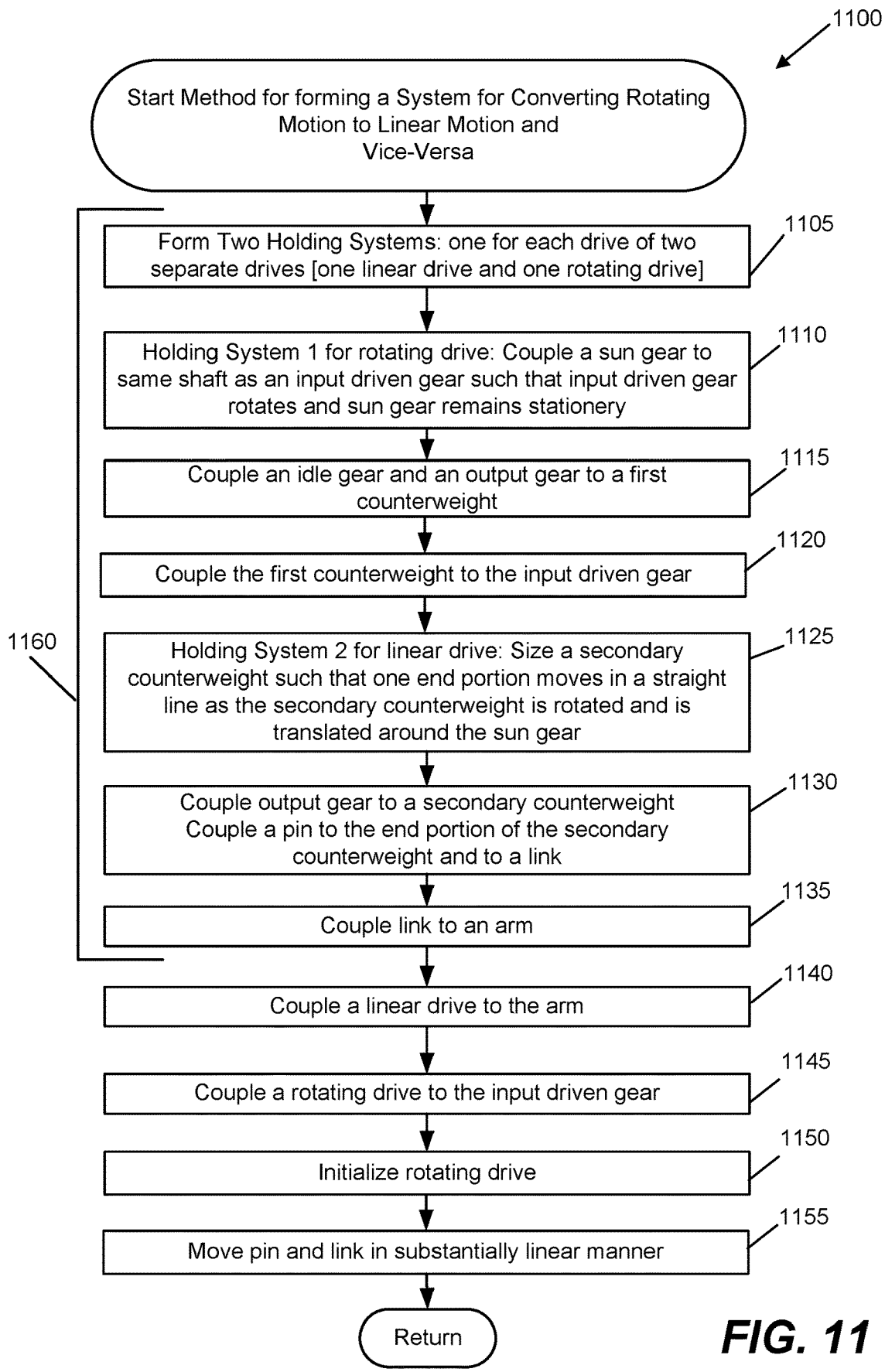
FIG. 11 illustrates a flow chart of a method for forming a system for converting rotating motion to linear motion according to one exemplary embodiment.

Referring now to FIG. 11, this figure illustrates a flow chart for a method 1100 for forming a system 100 for converting rotating motion to linear motion according to one exemplary embodiment. This method 1100 generally corresponds with the exemplary embodiment illustrated in FIGS. 1-10. If certain steps are modified and/or removed, then this method 1100 may also apply to other, future exemplary embodiments as understood by one of ordinary skill in the art.

Step 1105 is the first step of method 1100 for converting rotating motion to linear motion, and vice versa. In step 1105, two holding systems may be formed: one for each drive of two separate drives, where one drive is a linear drive 106 and one drive is a rotating drive 110. Next, in step 1110, the first holding system may be formed for the rotating drive 110: a sun gear 126 may be coupled to the same shaft 114 as an input driven gear 116 as illustrated in FIG. 1 such that the input driven gear 116 rotates about the shaft 114 while the sun gear 126 remains stationary.

Subsequently, in block 1115, an idler gear 136 and an output gear 124 may be coupled to a first counterweight 118. Next, in step 1120, the first counterweight may be coupled to the input driven gear 116.

Next, in step 1125, a second holding system for the linear drive 106 may be formed: a secondary counterweight 128 may be sized (dimensioned) appropriately (correctly) such that one end portion of the counterweight 128 moves in substantially a straight line as the secondary counterweight is rotated and is translated around the sun gear 126.

Subsequently, in step 1130, the output gear 124 may be coupled to the secondary counterweight 128. Also a pin 134 may be coupled to the end portion of the secondary counterweight 128 and a ram connecting link 130. Next, in step 1135 the ram connecting link 130 may be coupled to an arm 104. Steps 1105-1135 have been designated with reference character 1160 to denote that these steps form two holding systems for the conversion of rotating motion into linear motion and vice versa.

Referring now to step 1140, in this step, the linear drive 106 or means 106 for receiving linear motion may be coupled to the arm 104. Next, in step 1145, the rotating drive 110 or means 110 for producing linear motion may be coupled to the input driven gear 116.

In step 1150, the rotating drive 110 may be initialized. In other words, the rotating drive 110 may begin to produce rotating motion. However, one of ordinary skill the art recognizes that if the linear drive 106 was driven by a motor or some other external force [for converting linear motion to rotating motion], then the linear drive 106 driven by a motor (not illustrated) could begin motion at step 1150 such that linear motion would eventually be converted to rotating motion upon the rotating drive 110, or more appropriately, the means for receiving rotating motion 110.

Referring back to step 1150, after this step, in step 1155, the pin 134 and link 130 may be kept/maintained in a single plane while moving the shaft or ram 104 and while transferring force from the rotating secondary counterweight 128.

One of ordinary skill in the art recognizes that the steps of method 1100 suggest how the system 100 of FIGS. 1-10 may be formed while also describing how the system 100 may be used. Method 1100 generally describes the motion and forces of the system 100 after the system 100 has been assembled. It is quite evident that the parts and elements of system 100 may be assembled in a different sequence of steps than those proposed as illustrated in method 1100. However, once the system 100 is formed, the general motion and forces described in method 1100 are generally applicable as understood by one of ordinary skill the art.

Certain steps in the processes or process flows of FIG. 11 as well as processes and flows illustrated/suggested by the mechanical drawings of FIGS. 1-10 in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention.

The materials for the parts illustrated in the several figures, such as the gears, rods, arms, and links may be made of metal, such as steel. Other metals may be employed without departing from the scope of this disclosure. Other metals include, but are not limited to, aluminum, bronze, copper, tin, lead, and alloys/combinations thereof. Further, other materials besides metals are also possible and are included within the scope of this disclosure. Other materials besides metals include, but are not limited to, polymers (i.e. plastics), ceramics, composite materials, and any combination thereof.

As noted in the background section, the inventive method and system are well suited for applications in the aluminum can manufacturing field or beverage/food containers in general. However, other fields of use are possible. For example, other fields of use for the inventive method and system include, but are not limited to, electronics manufacturing, automobile manufacturing, and tool & die manufacturing. In electronics manufacturing, the scale of the system may be made very small such on the order of centimeters and millimeters. Further, the rotating drive and/or linear drive may be coupled to robots [i.e. such as pick-and-place robots, etc.] used in printed circuit board (PCB) manufacturing.

Although a few embodiments have been described in detail above, those skilled in the art will readily appreciate that many modifications are possible in the embodiments without materially departing from this disclosure. Accordingly, such modifications are intended to be included within the scope of this disclosure as defined in the following claims.

For example, while several gears have been illustrated in the several views, it is possible that the functions/movement of these elements could be replaced/substituted by additional and/or fewer structures. For example, the function/movement of several of the gears could be replaced by additional smaller gears as understood by one of ordinary skill in the art. Further, mechanical equivalents of the gears and linkages illustrated—like belts, chains, sprockets, and/or pulleys—could be substituted for many of the structures illustrated in the several views as understood by one of ordinary skill in the art. Such substitutions of mechanical equivalent structures are included within the scope of this disclosure.

Similarly, in the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, sixth paragraph for any limitations of any of the claims herein, except for those in which the claim expressly uses the words 'means for' together with an associated function.

Therefore, although selected aspects have been illustrated and described in detail, it will be understood that various substitutions and alterations may be made therein without departing from the spirit and scope of the present invention, as defined by the following claims.

What is claimed is:

1. A system for transforming rotating motion into linear motion comprising:
    means for producing rotating motion;
    means for receiving linear motion;
    a first gear coupled to the means for producing rotating motion;
    a second gear coupled to the first gear, the second gear being configured to remain stationary while the first gear is rotated by the means for producing rotating motion;
    a first holding device that supports an idler gear and an output gear, the first holding device being coupled to the first gear such that the first holding device rotates with the first gear, the idler gear being coupled to the second gear and the output gear; the first holding device translating the idler gear around the second gear when the first gear is rotated, the idler gear rotating the output gear when the idler gear is translated around the second gear;
    a second holding device coupled to the output gear which rotates with the output gear when the output gear is rotated, the second holding device and the output gear being rotatable relative to each other; the second holding device having an end portion coupled to a link; and
    an arm coupled to the means for receiving linear motion and to the link, the end portion of the second holding device moving in a substantially linear direction when the second holding device is rotated by the output gear and translates around the second gear, the end portion moving the link in the substantially linear direction.

2. The system of claim 1, wherein the first holding device comprises a counterweight.

3. The system of claim 1, wherein the second holding device comprises a counterweight.

4. The system of claim 1, wherein the end portion of the second holding device comprises a pin.

5. The system of claim 4, wherein the pin is coupled to the link.

6. The system of claim 1, the first gear and second gear are coupled to a shaft.

7. The system of claim 6, where in the first gear and second gear share a same geometrical center about which the first gear rotates while the second gear remains stationary.

8. The system of claim 1, wherein the arm comprises a shaft, the arm being coupled to a bearing.

9. The system of claim 1, wherein the link comprises a pin that is coupled to the arm.

10. A system for transforming rotating motion into linear motion comprising:
    a rotating drive;
    a first gear coupled to the rotating drive;
    a second gear coupled to the first gear, the second gear being configured to remain stationary while the first gear is rotated by the rotating drive;
    a first holding device that supports an idler gear and an output gear, the holding device being coupled to the first gear such that the first holding device rotates with the first gear, the idler gear being coupled to the second gear and the output gear; the holding device translating the idler gear around the second gear when the first gear is rotated, the idler gear rotating the output gear when the idler gear is translated around the second gear;
    a second holding device coupled to the output gear which rotates with the output gear when the output gear is rotated, the second holding device and the output gear being coupled to a shaft, the second holding device being rotatable about the shaft; the second holding device having an end portion coupled to a link; and
    an arm coupled to the link, the end portion of the second holding device moving in a substantially linear direction when the second holding device is rotated by the output gear and translates around the second gear, the end portion moving the link and arm in the substantially linear direction.

11. The system of claim 10, wherein the arm is part of a linear drive.

12. The system of claim 10, wherein the first holding device comprises a counterweight.

13. The system of claim 10, wherein the second holding device comprises a counterweight.

14. The system of claim 10, wherein the end portion of the second holding device comprises a pin.

15. The system of claim 14, wherein the pin is coupled to the link.

16. The system of claim 10, the first gear and second gear are coupled to a shaft.

17. The system of claim 16, where in the first gear and second gear share a same geometrical center about which the first gear rotates while the second gear remains stationary.

18. The system of claim 10, wherein the arm comprises a shaft, the arm being coupled to a bearing.

19. The system of claim 10, wherein the link comprises a pin that is coupled to the arm.

20. The system of claim 10, wherein the rotating drive comprises a motor.

* * * * *